United States Patent
Scott et al.

[11] Patent Number: 6,120,367
[45] Date of Patent: Sep. 19, 2000

[54] DECORING SAW

[75] Inventors: Jerry Silliman Scott, Dakota Dunes, S. Dak.; Steven Wesley Henry, Fairbank, Iowa; William Lauren Mahl, Dakota Dunes, S. Dak.; James F. Dill, Foxboro, Mass.; William G. Leary, Upton, Mass.; Andrew C. Harvey, Waltham, Mass.

[73] Assignee: IBP, inc., Dakota Dunes, S. Dak.

[21] Appl. No.: 09/154,925

[22] Filed: Sep. 17, 1998

[51] Int. Cl.[7] ............................ A22C 17/02; A22C 17/04
[52] U.S. Cl. ............................................. 452/135; 452/122
[58] Field of Search ...................... 452/135, 122

[56] References Cited

U.S. PATENT DOCUMENTS

| | | | |
|---|---|---|---|
| 63,572 | 4/1867 | Stearns . | |
| 71,069 | 11/1867 | Russell | 99/544 |
| 155,880 | 10/1874 | Meyer | 408/54 |
| 186,944 | 2/1877 | Nudd | 143/85 |
| 342,661 | 5/1886 | Whitaker | 408/54 |
| 581,183 | 4/1897 | Tope et al. | 408/54 |
| 1,435,877 | 11/1922 | Reubold | 452/136 |
| 1,470,807 | 10/1923 | Carr | 452/136 |
| 1,722,450 | 7/1929 | Barry | 452/137 |
| 2,210,765 | 8/1940 | Mahlke | 146/160 |
| 2,297,158 | 9/1942 | McDonald | 146/106 |
| 2,369,925 | 2/1945 | Smith | 30/124 |
| 2,534,219 | 12/1950 | Berglund | 452/136 |
| 2,751,941 | 6/1956 | Smith | 143/85 |
| 2,753,899 | 7/1956 | Murfin | 143/85 |
| 2,780,896 | 2/1957 | Jaye | 51/1 |
| 2,785,434 | 3/1957 | Terranova | 17/1 |
| 2,827,657 | 3/1958 | Bettcher | 452/137 |
| 2,962,752 | 12/1960 | Massengill | 452/171 |
| 3,197,808 | 8/1965 | Mears | 452/171 |
| 3,210,801 | 10/1965 | Terranova | 452/136 |
| 3,312,131 | 4/1967 | Gilmore | 83/875 |
| 3,531,825 | 10/1970 | Segur et al. | 452/136 |
| 3,705,440 | 12/1972 | Lewis | 452/122 |
| 3,916,484 | 11/1975 | Kennedy . | |
| 4,295,263 | 10/1981 | Davis | 29/561 |
| 4,557,014 | 12/1985 | Vogt . | |
| 4,970,755 | 11/1990 | Leblanc | 452/134 |
| 5,090,939 | 2/1992 | Leblanc | 452/127 |
| 5,462,477 | 10/1995 | Ketels | 452/135 |
| 5,499,390 | 3/1996 | Vanochten et al. | 452/122 |
| 5,580,304 | 12/1996 | Bleth et al. | 452/122 |
| 5,746,648 | 5/1998 | Boeyen et al. . | |

FOREIGN PATENT DOCUMENTS 241249   8/1977   U.S.S.R. .......................... A22B 5/00

*Primary Examiner*—Willis Little
*Attorney, Agent, or Firm*—Herzog, Crebs & McGhee, LLP; Mark E. Stallion

[57] ABSTRACT

A partially automated decoring saw having a tubular blade and a table surface partially blocking the saw blade opening and means decreasing the blockage temporarily to allow for passage of an enlarged portion of the core into the saw. A core knocker can also be provided, as can air purge of blade seals to achieve partial self-cleaning.

65 Claims, 18 Drawing Sheets

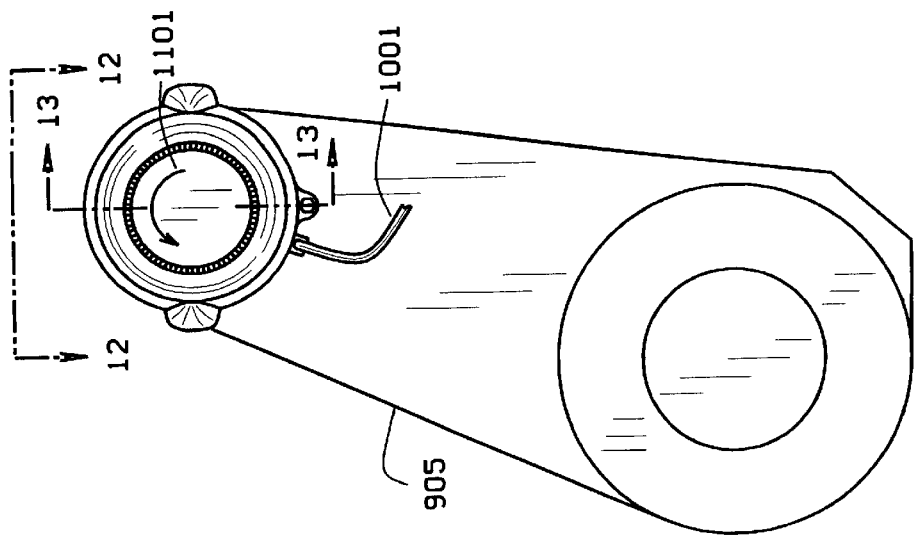
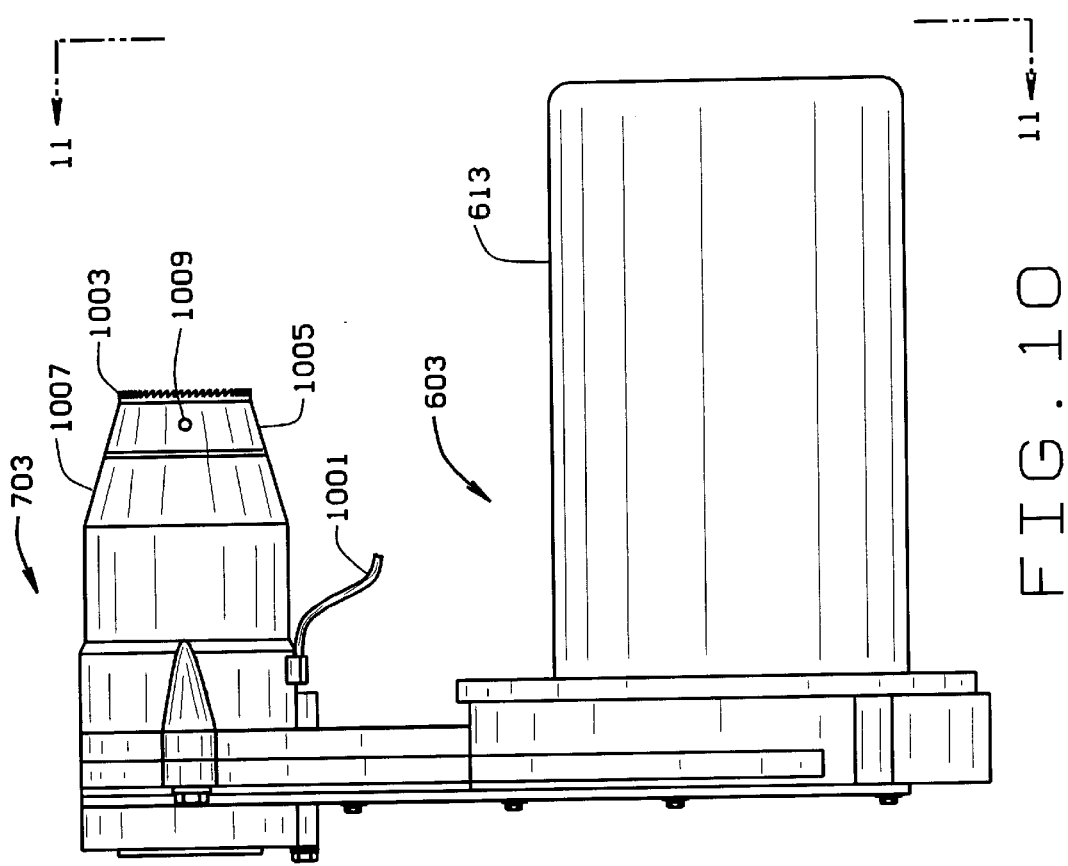

DECORING SAW

BACKGROUND OF THE INVENTION

1. Field of the Invention

This invention relates to decoring saws and to meat processing equipment and more particularly to meat processing saws and to methods for their use.

2. Related Art

Pig processing has traditionally been a manually intensive industry. Even in a modern plant, hundreds of workers use hand held knives or hand held electric saws to cut up the pork carcass.

In order to understand pork processing, it is useful to first understand the relevant portion of the anatomy of a pig. The spine of a pig typically includes 7 cervical vertebrae, 14 thoracic vertebrae and 7 lumbar vertebrae. The first cervical vertebra is commonly referred to as the "atlas bone." The point of connection between the skull and the atlas bone is often referred to as the atlas joint. Pigs typically have 14 ribs that depend from the spine in the region of the thoracic vertebrae. Spinuous processes, called featherbones, extend from and above each of the 14 thoracic vertebrae. Pigs that are raised for food vary in size and weight, typically ranging from 170 pounds to 370 pounds on the hoof (prior to slaughter.)

In a modern processing plant, a pig is eviscerated, the head is removed and the carcass is then split into two halves longitudinally along the backbone. Each half is then cut in two creating the shoulder and the hindquarter.

One particularly difficult portion to process is the shoulder portion, because removal of the backbone is required and the atlas bone is much bigger than the other vertebrae. In addition, because the pigs vary in size, pork shoulders vary in size and weight, often ranging between 22 and 49 pounds. A typical pork shoulder will include all of the cervical vertebrae, several thoracic vertebrae, and between 2 and 4 ribs, depending on customer order specifications. Typically the backbone, the featherbones and the ribs are removed from the pork shoulder by a worker using a hand held knife before the shoulder moves on for further processing. In some processing plants, as many as 7 butchers are employed on each shift to accomplish just this task. It normally takes about 7 seconds to manually debone the spine from each shoulder. It is a repetitious process, as a large processing plant may process more than 1000 pigs per hour, and thus more than 2000 pork shoulder per hour. The repetitive motions of the wrist and shoulder required for deboning pork shoulders sometimes cause cumulative trauma disorder to the worker, called a "lifter" who "lifts" the spine from the shoulder. The skeletal system that is removed by the lifter is then given to another worker called a "robber" for further processing. The "robber" removes most of the meat that remains on this skeletal system, typically by use of a hand held electric saw such as a Wizard Model 620. Vibrations from an imbalanced Wizard saw can also cause problems for the robbers. A better method is needed to reduce or eliminate the need for lifters and robbers and thus reduce the incidence of cumulative trauma disorders in the workforce. In addition, it would be desirable to leave more meat with the shoulder, as that meat sells for more than the robbed meat, the robbed meat typically going instead into sausage or pizza toppings or the like.

A better system is needed.

SUMMARY OF THE INVENTION

It is an object of the invention to provide a better system and eliminate some of the safety risks in removal of pork neck bones.

It is a further object of the invention to speed up the process of removal of pork neck bones.

It is a further object of the invention to remove the spine from the pork shoulder by cutting through the ribs that are present, the featherbones and surrounding tissue.

It is a further object of the invention to cut primarily through tissue so as to remove as much of the cervical vertebrae and thoracic vertebrae as possible while minimizing the amount of meat left attached to the removed spine, as obtaining meat is the purpose of pork processing.

It is thus a further object of the invention to remove the neck bone while leaving more meat in the pork shoulder than is done on average by manual removal methods.

These objects are achieved in the invention by providing a tubular table saw that can be used to remove the neck bone and backbone from pork shoulders and eliminate much of the manual aspects of the neck bone removal process in pork shoulder processing. Table drop and core knocker features are employed to minimize the chance of injury to the operator.

BRIEF DESCRIPTION OF THE DRAWINGS

The drawing includes:

FIG. 10, a left side elevational view of the saw blade assembly and motor of the saw of FIG. 6;

FIG. 11, a front elevational view of the saw blade assembly and motor of FIG. 10, taken along lines 11—11;

DESCRIPTION OF THE PREFERRED EMBODIMENTS

Definitions

Figure 2:
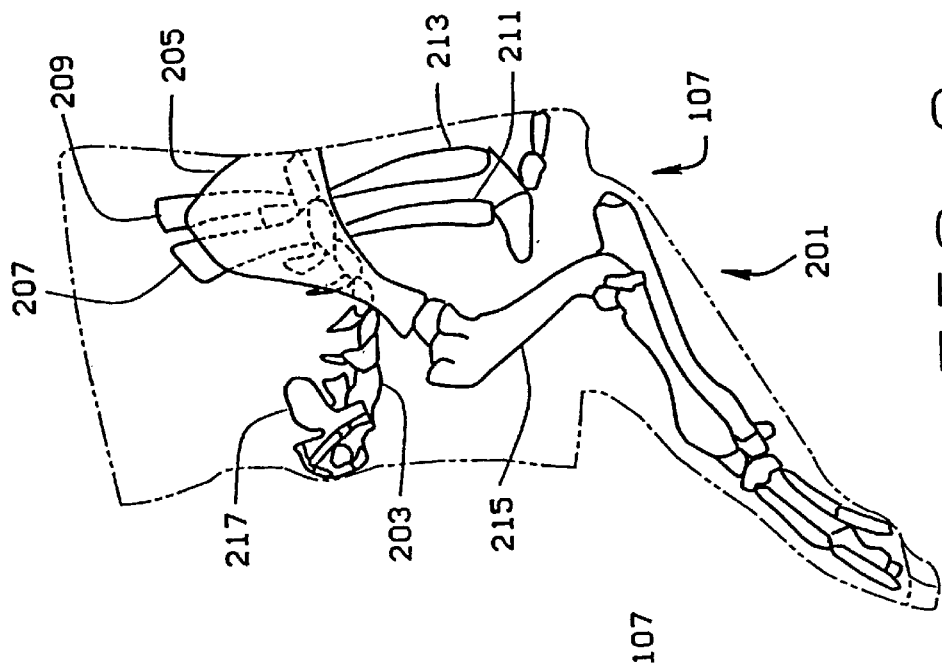
FIG. 2, an external left side view of a pork shoulder showing the skeletal structure prior to longitudinal splitting.

"Table-drop" means lowering of a front portion of a table adjacent a saw in order to increase the depth of the cut of a saw blade of the saw into the work piece.

"Core knocker" means a device to push a core out of a tubular decoring saw. This would typically be a mechanical finger mechanically inserted into a frontal opening of the tubular saw blade to drive a core rearwardly through and out of the blade. Where the core is a bone the term "bone knocker" may be used instead of core knocker.

"Neck bone" means cervical vertebrae 1–7 and any spinal vertebrae in the pork shoulder.

Description of the Best Mode Currently Envisioned

The drawings show the best mode currently envisioned by the inventors of making the invention. It should be understood that there are other modes and using slightly different components, particularly in regard to shape, size and ancillary functions, as well as the particular work piece used. Although the saw may have applicability to any decoring operation where a core is held by structure of sufficient strength to be advantageously sawed, it is shown in a preferred version as a pork shoulder despiner. In view of, and in order to fully comply with, the current cumbersome best mode and enablement requirements for patent disclosures, specifics are mentioned below which are overly specific as respects the broad aspects of the decoring saw. These specifics are not intended to limit the claims unless specifically referenced in the claims, but rather are made to comply with statutory and case law obligations of full disclosure. Likewise, specifics may be given below to help the reader understand the drawings better or preferred materials, preferred methods of use, preferred work pieces or preferred saw structure. However, broad classes of materials and structures which perform the same or similar function are intended to be encompassed even if not specifically set forth herein, unless the same are excluded by the function of the device to the ordinary artisan. In view of the inclusion of twenty-two Figs. to show the detailed operation of the preferred embodiment of the pork shoulder despining saw of the invention and the method of operation of the invention for pork despining, it is felt that to show the numerous alternative less preferred versions, such as those including some, but not all, of the preferred features, would just be confusing to the reader without adding to the disclosure for purposes of enabling those of ordinary skill in the relevant art. Likewise, to show the saw in versions for other decoring operations would be of little benefit to the ordinary artisan in decoring operations, who would need to adapt the saw of the invention to their particular work piece by minor modifications within the scope of the invention. Finally, it is to be understood that cost and time considerations necessarily limit the length of any patent disclosure. Extensive listing of alternative materials that would be known to those skilled in the relevant art is sometimes omitted. Such listings lengthen the disclosure and significantly increase the cost of preparation of the application without any corresponding benefit to the public, particularly those of ordinary skill in the art who are most likely to be reading the patent disclosure. It is intended, however, that the scope of the claims not be limited by this disclosure but rather by the prior art and what is obvious from the prior art alone, without use of hindsight and without use of this disclosure.

With the above in mind, the nature of a pork shoulder will be described in prior art FIGS. 1–3 and then as affected by the invention in FIGS. 4–5. Then in FIGS. 6–22 the functional interconnection of the main operational parts of the preferred form of the saw of the invention will be described. Finally, the method of the invention will be described and some discussion of exemplary alternative features will be made. It is again emphasized that this alternative discussion is not, and indeed could never be, inclusive of all alternatives that will be obvious to the ordinary artisan upon reading the disclosure.

The numbering system, which will be employed, is that the last two digits will define the part and the prior one or two digits will give the drawing in which the part first appears or is first described in the specification. Thus part 101 is normally the first part described with reference to FIG. 1 and part 2001 normally is the first part first described with reference to FIG. 20. To distinguish reference numbers from the drawing numbers, the numbering will start with 101 and to allow for inclusion of reference numbers during editing, even numbers may be omitted. No implication should be drawn by absence of numbers or numbers seemingly out of sequence.

Figure 1:
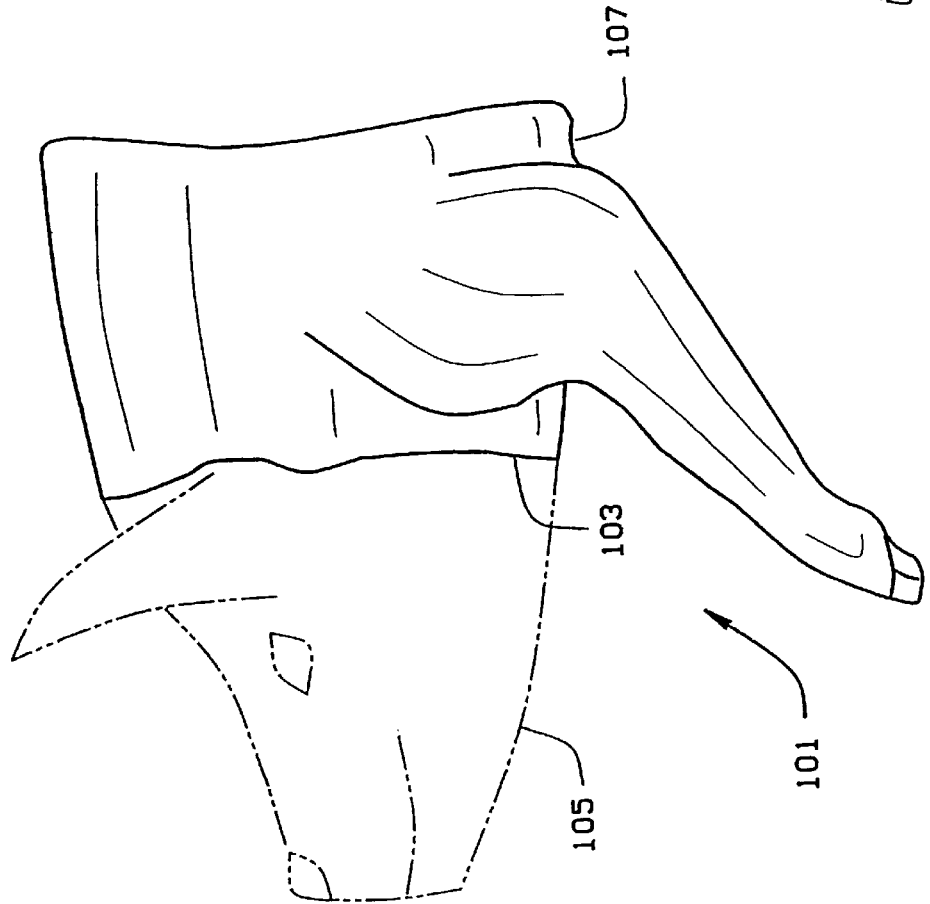
FIG. 1, a left side external view of the front portion of a pork carcass showing the "pork shoulder" ion.

Looking now to FIG. 1, the front portion 101 of a pig carcass is shown, with an indication of approximately line 103, where the head 105 would be separated from the pork shoulder 107.

FIG. 2 shows the skeleton portion 201 within shoulder 107, which includes a neck bone 203, a blade bone 205, featherbones 207,209, ribs 211, 213, and foreleg bones 215. The first bone or first cervical vertebrae of the neck bone is called the "atlas bone" 217, and is considerably larger than the other vertebrae of the neck bone. The ribs and featherbones are attached to the neck bone.

Figure 3:
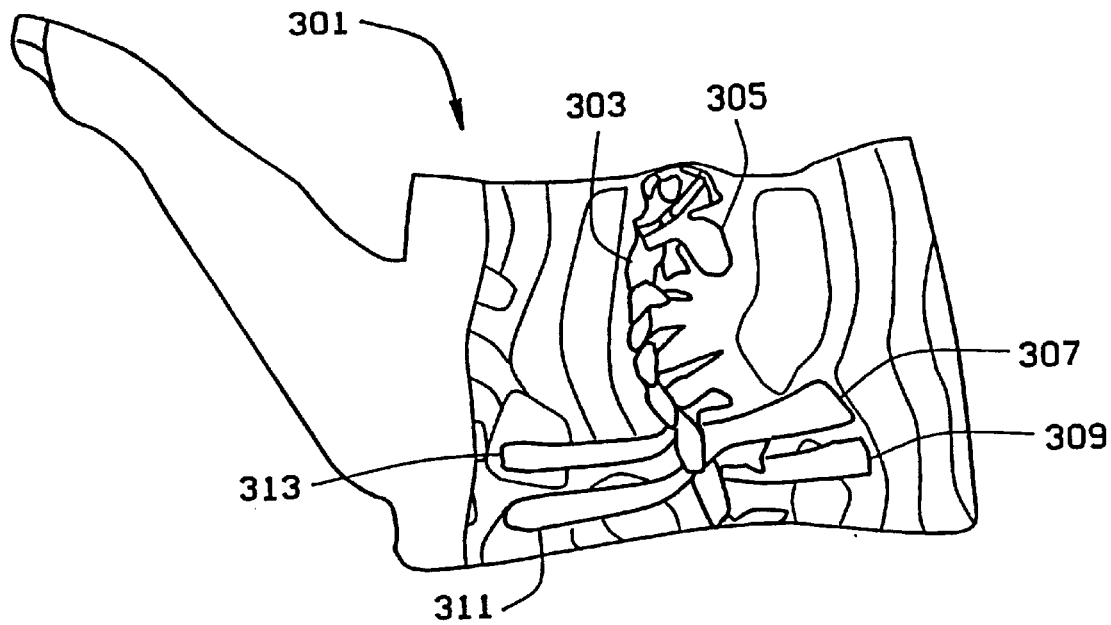
FIG. 3, an external left side view of a right pork shoulder prior to backbone removal.

FIG. 3 shows the right pork shoulder 301 following head removal and longitudinal splitting of the carcass. It will be seen that the right half 303 of the neck bone is exposed with the large right half 305 of the atlas bone at the front, This neck bone 303 is customarily removed to allow further processing of the shoulder. Since featherbones 307,309 and ribs 311,313 are attached to the neck bone, they have been customarily removed also, with consequent possible loss of meat attached thereto.

Figure 4:
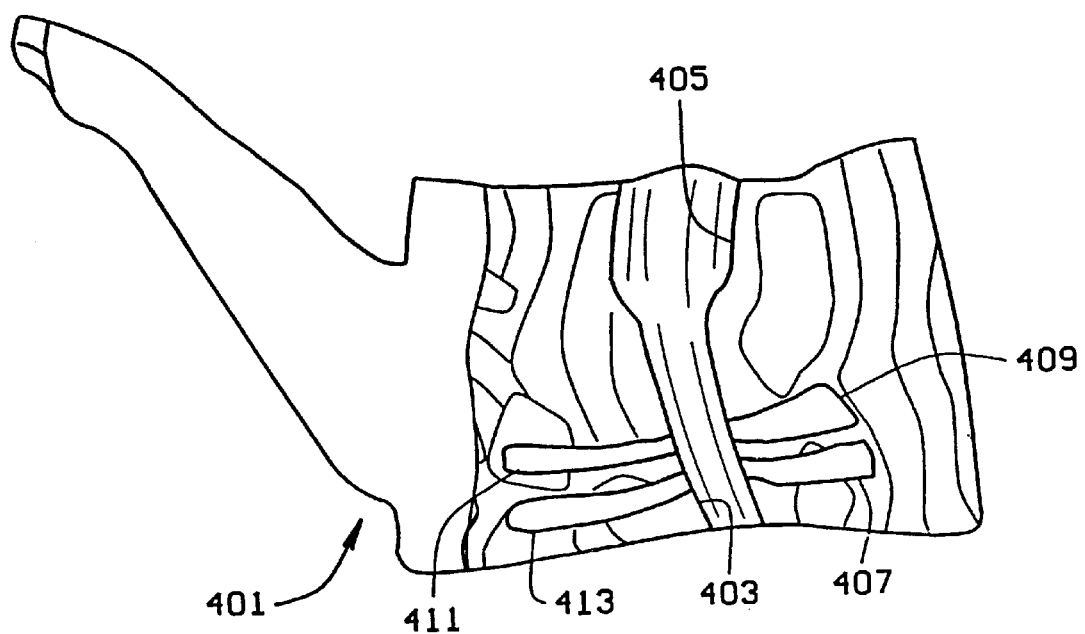
FIG. 4, an external side view of a right pork shoulder following backbone removal by use of the method and apparatus of the invention.

Referring now to FIG. 4, the invention will begin to be described. First, in FIG. 4, the end result of the invention is shown, a pork shoulder 401 with the spine removed. Since the spine of a pig in the shoulder is curved, the cut 403 taken by the present invention is desirably curved to minimize the amount of meat cut out with the spine. In accordance with the invention, the saw cuts a larger portion of the front of the spine than of the rear of the spine for purposes below described and this results in a cut 403 having an enlarged front portion 405. This leaves the upper portion 407 and 409 of the featherbones and the lower portions of ribs 411, 413 in the shoulder as despined. A large portion of 405 of cut 403 is shown in exaggerated size in FIG. 4 to emphasize its size and location.

Figure 5:
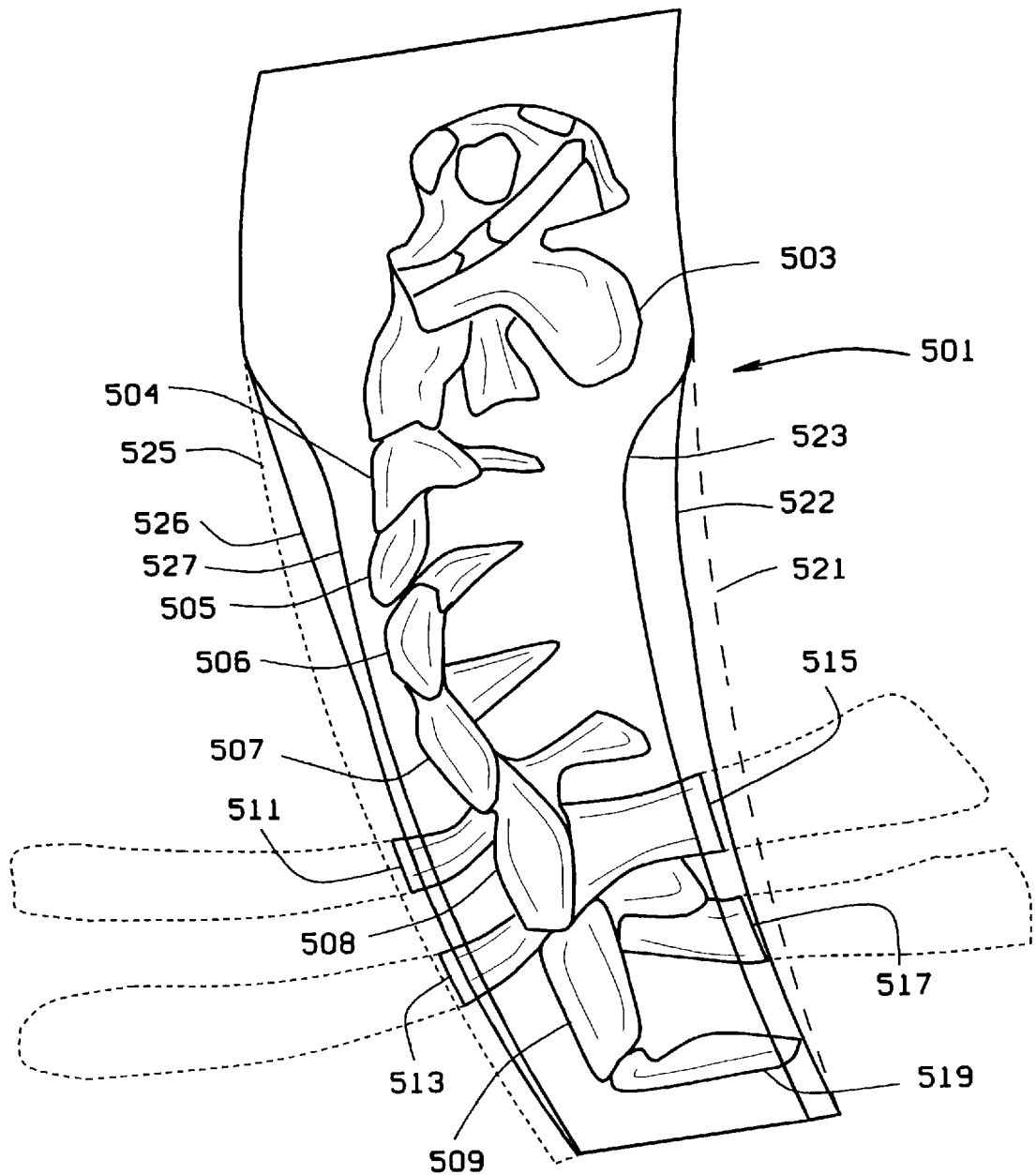
FIG. 5, an enlarged view of the portion of bone removed by the method and apparatus of the invention from the shoulder of FIG. 4.

FIG. 5 shows the removed portion of the spine 501, including Atlas bone 503, and vertebra 504–509. Also contained within the removed spine 501 are the upper portion 511 and 513 of the first and second ribs and the lower portion 515 and 517 of the first and second featherbones as well as another bone portion 519. It is noted that the portion 501 is downwardly arched as is the cervical portion of a pig spine. This arching of the cut is desirable to minimize the amount of meat loss during despining. It will also be appreciated that the portion of the removed spine immediately behind the Atlas bone is of reduced diameter relative to the Atlas bone and, ideally, the upper border of the removed spine should drop slightly once the Atlas bone is passed in order to minimize meat loss. A normal straight cut is shown by dotted line 521, a tapered cut, produced by the "table drop" feature of the present invention, is shown by solid line 522 and an even more optimal cut is shown by solid line 523 which will be seen to steeply drop immediately aft of the Atlas bone. On the lower side of the spine 501 it is seen that the closer the cut is to the spine the less meat is extracted during despining. Thus, while a lower normal straight cut of removed spine 501 might be as shown at dotted line 525, a tapered cut as shown at dotted line 526 and an optimal cut shown at solid line 527. It will be appreciated that in order to allow suitable tolerance for despining, unless the operation is automated, the optimal cuts may not be practically achievable without normal operator error resulting in excessive bone fragments.

Figure 6:
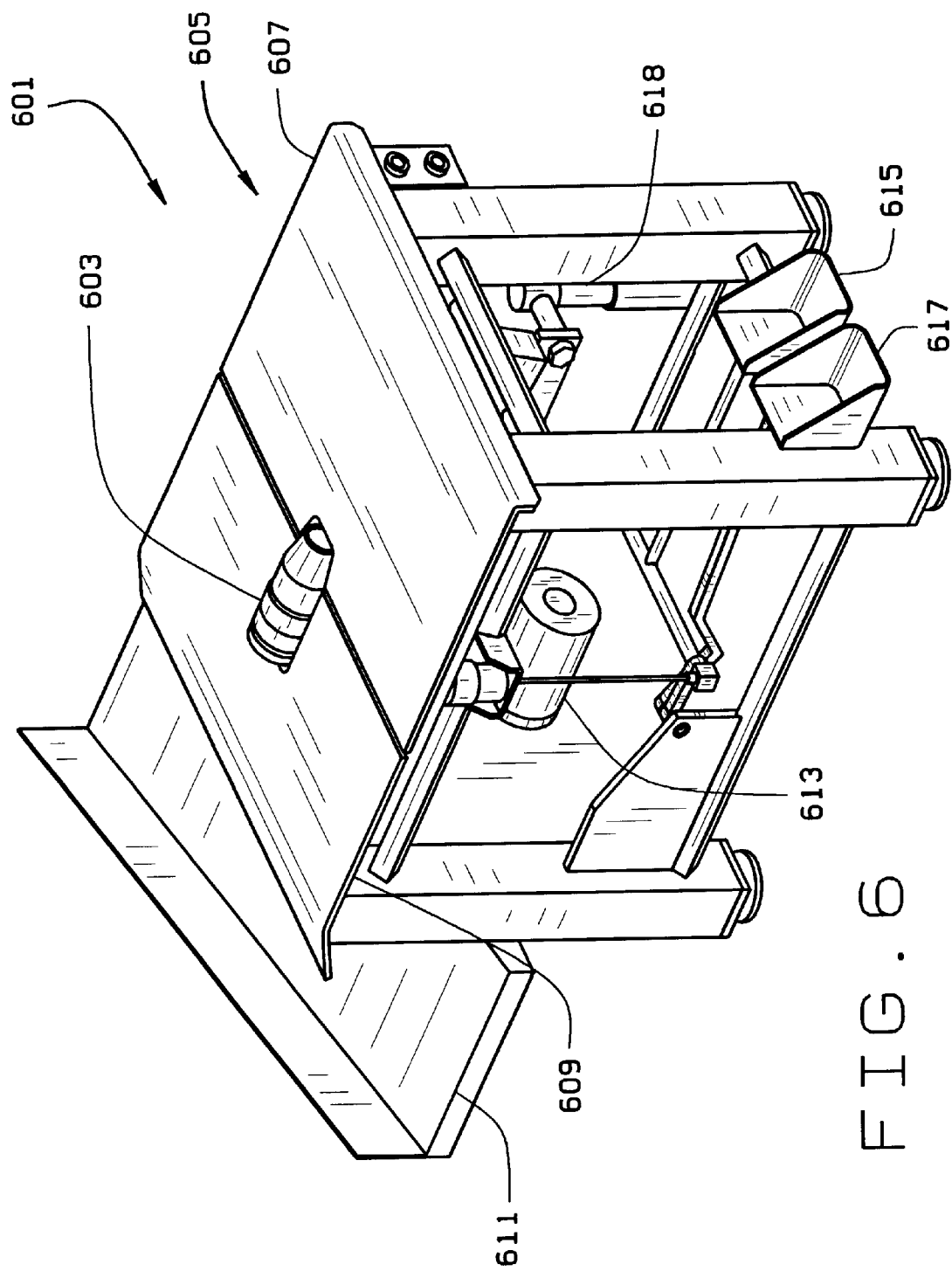
FIG. 6, an upper left front perspective view of a neck bone saw according to a preferred embodiment of the invention.

Looking now to FIG. 6, the pork shoulder despining saw of the preferred embodiment of the invention is shown. This saw 601 appears very complex at first glance but it is actually easy to understand when seen in actual operation. Saw 601 comprises a saw assembly 603, a front table portion 607, a rear table portion 609, a drop chute 611, a motor 613, a table drop mechanism 615, a bone knocker mechanism 617, and a saw height adjustment mechanism 618. The operation of these components will be described in more detail below with reference to the remaining figures of the drawing. Many of these components are exemplary, and could be replaced by similar components designed to be more easily washed down during cleaning. The saw assembly 603 appears to be horizontal, but would typically be declined slightly at its front end by a minimum of about eight degrees.

Figure 7:
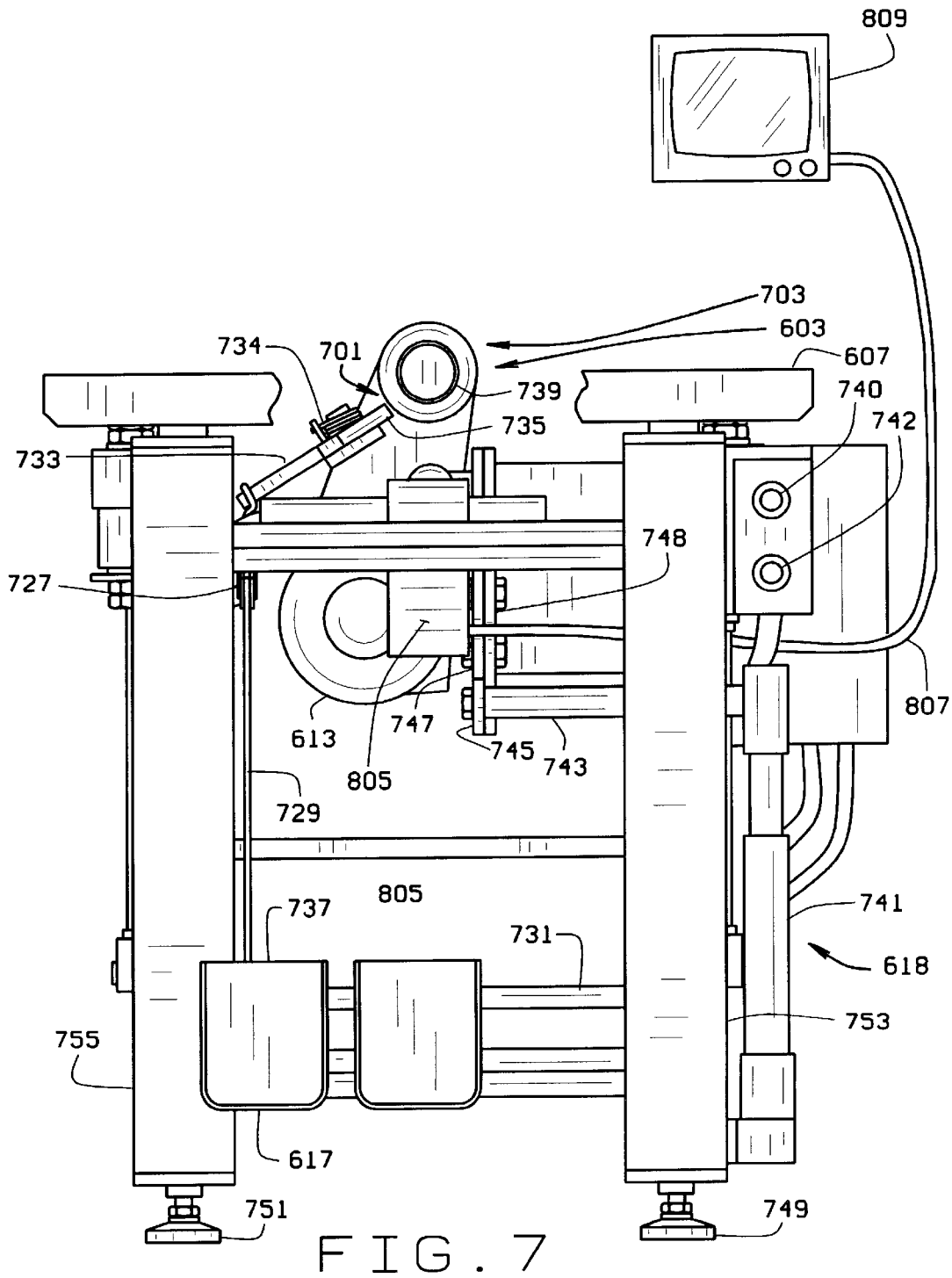
FIG. 7, a front elevational view of the neck bone saw of FIG. 6.

Looking now to FIG. 7, we see saw 601 from the front with the center portion of front table 607 removed to better show the saw assembly 603 and bone knocker 617 mechanism. Looking first to saw assembly 603 it is noted that assembly 603 includes a motor 613 which drives a belt 701 which drives a saw blade assembly 703.

Figure 20:
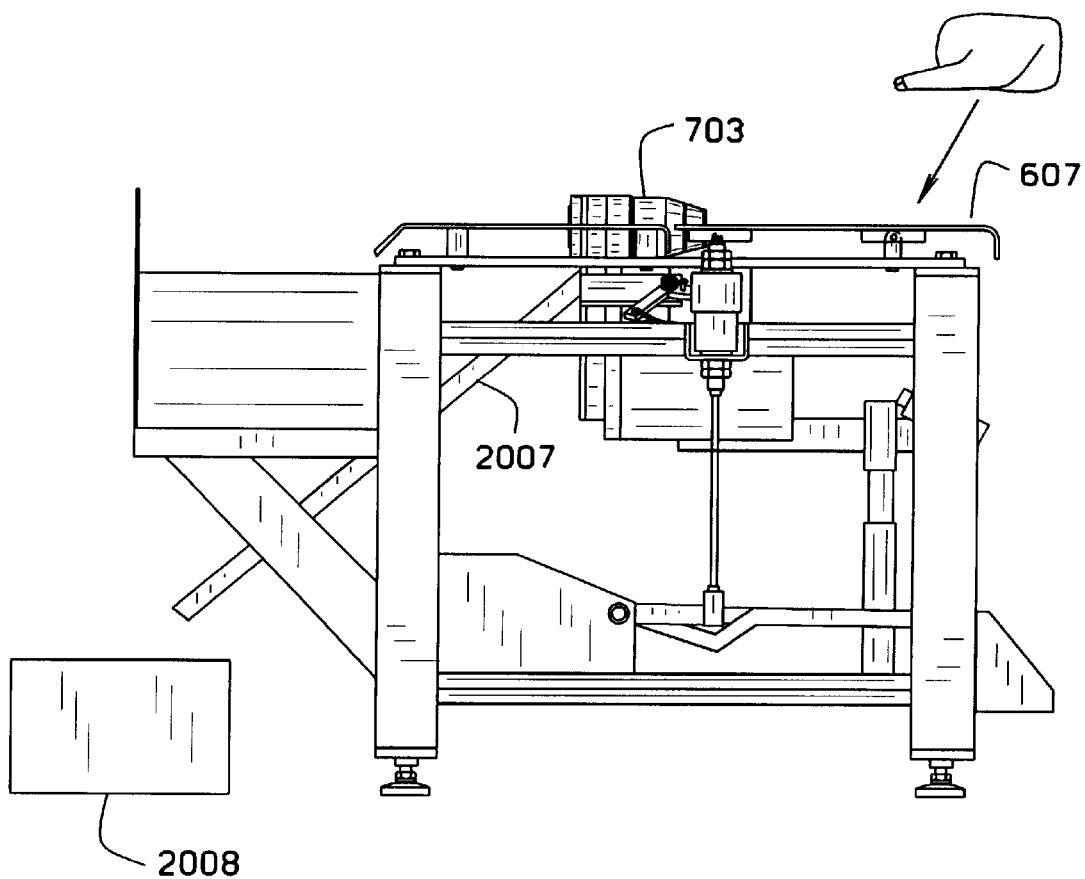
FIG. 20, a left side view of the saw of FIG. 6 in an upper position to allow placement of a pork should in position on the saw for commencement of despining.
Figure 21:
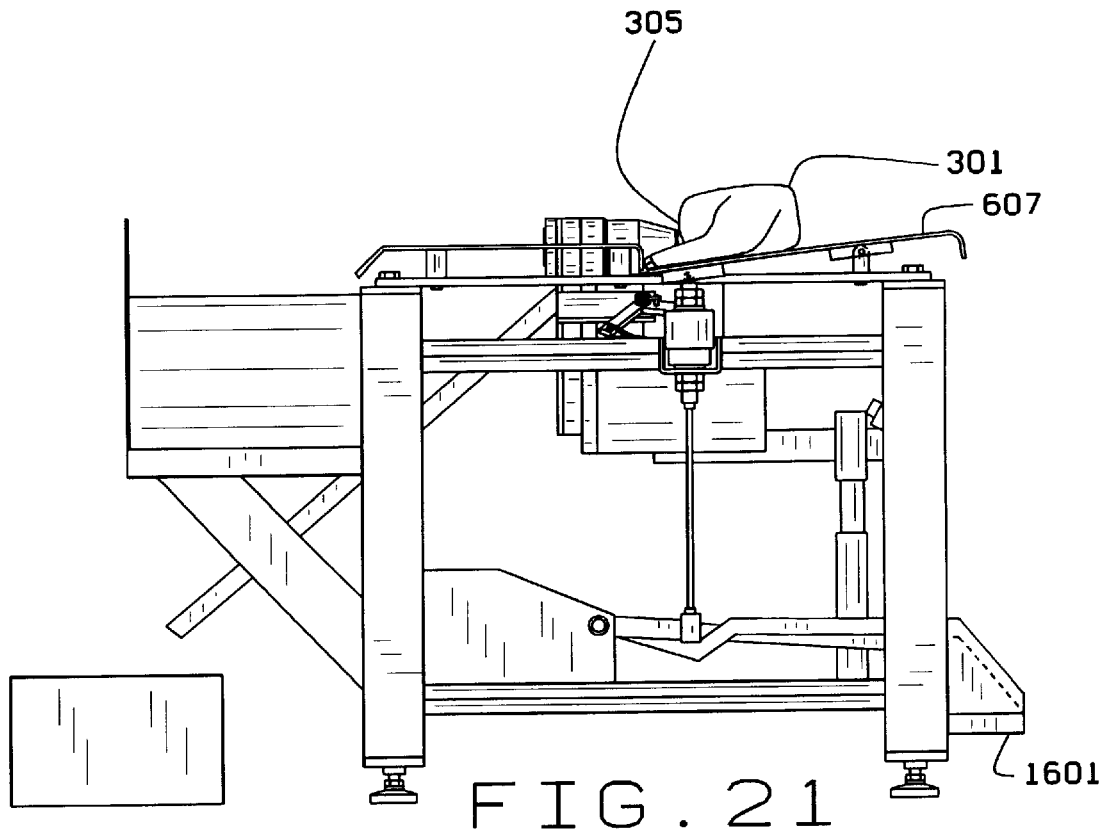
FIG. 21, a left side view of the saw of FIG. 6, but with the front table downwardly rearwardly inclined or "dropped" to allow insertion of the atlas bone into the saw blade opening during despining.
Figure 22:
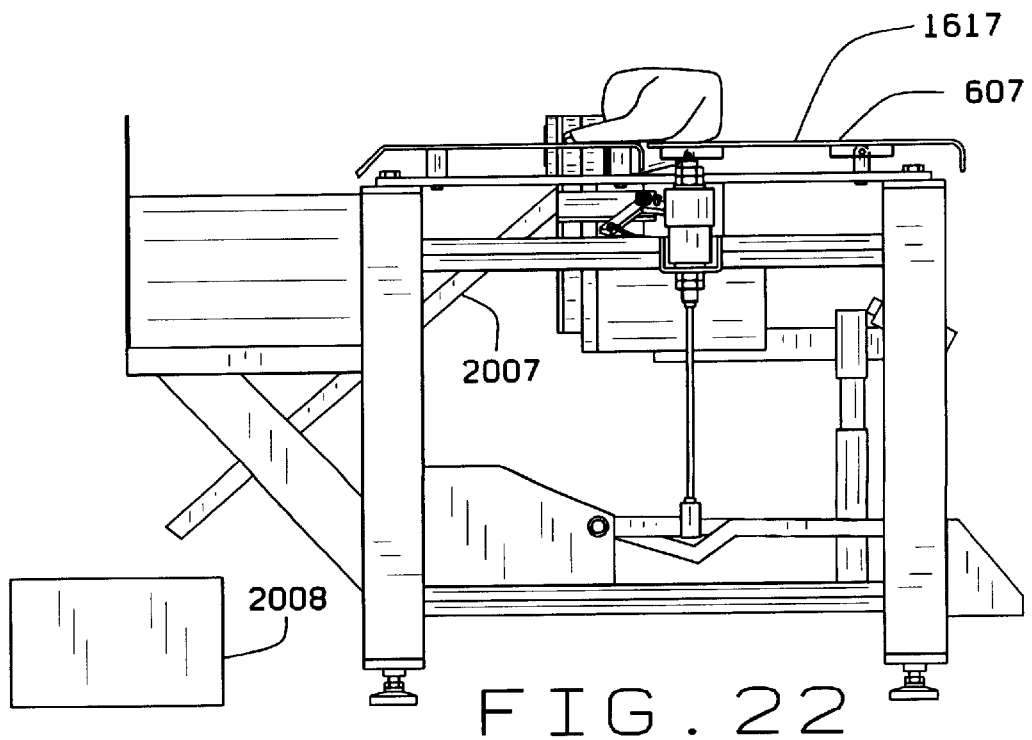
FIG. 22, a left side view of the saw of FIG. 6, but with the table returned to its upper position to allow the continuation and completion of despining following insertion of the atlas bone into the saw blade opening.

Looking next to bone knocker mechanism 617, it is seen that the bone knocker mechanism includes a pulley 727 and cable 729, a cross member 731, a pivot arm 733, a rotary spring 734, a finger 735, and a pedal 737. When pedal 737 is depressed, cable 729 is pulled down through pulley 727 to pivot arm 733 rearward against the action of spring 734 to push finger 735 into the opening 739 of saw blade assembly 703. Finger 735 pushes any contents of saw blade assembly 703 rearwardly through opening 739 and out the rear of the saw blade assembly onto drop chute 2007, as seen in FIG. 20. While bone knocker mechanism 617 is shown as being foot operated, it could be automatically operated or hydraulically or pneumatically operated, if desired, the objective being to allow remote operation so that the operators hands are not placed near the saw during removal of the spine from the saw assembly.

Looking next to the saw blade height adjustment mechanism 618 we see that this mechanism includes a raised button 740, a lower button 742, a telescopic post 741, a cross bar 743, a connector bar 745 and connector plates 747, 748. Buttons 740, 742 are depressed to raise or lower table 607 as better seen in FIGS. 9A and 9B. As post 741 is extended or retracted cross member 743 is raised or lowered to raise bar 745 and plates 747, 748 and with them saw assembly 603. This allows vertical adjustment of the height of saw blade assembly 703 relative to table 607 to accommodate larger or smaller pork shoulders. It will be seen that despiner 601 is provided with leveling pads 749, 751 and sturdy legs 753, 755.

Figure 8:
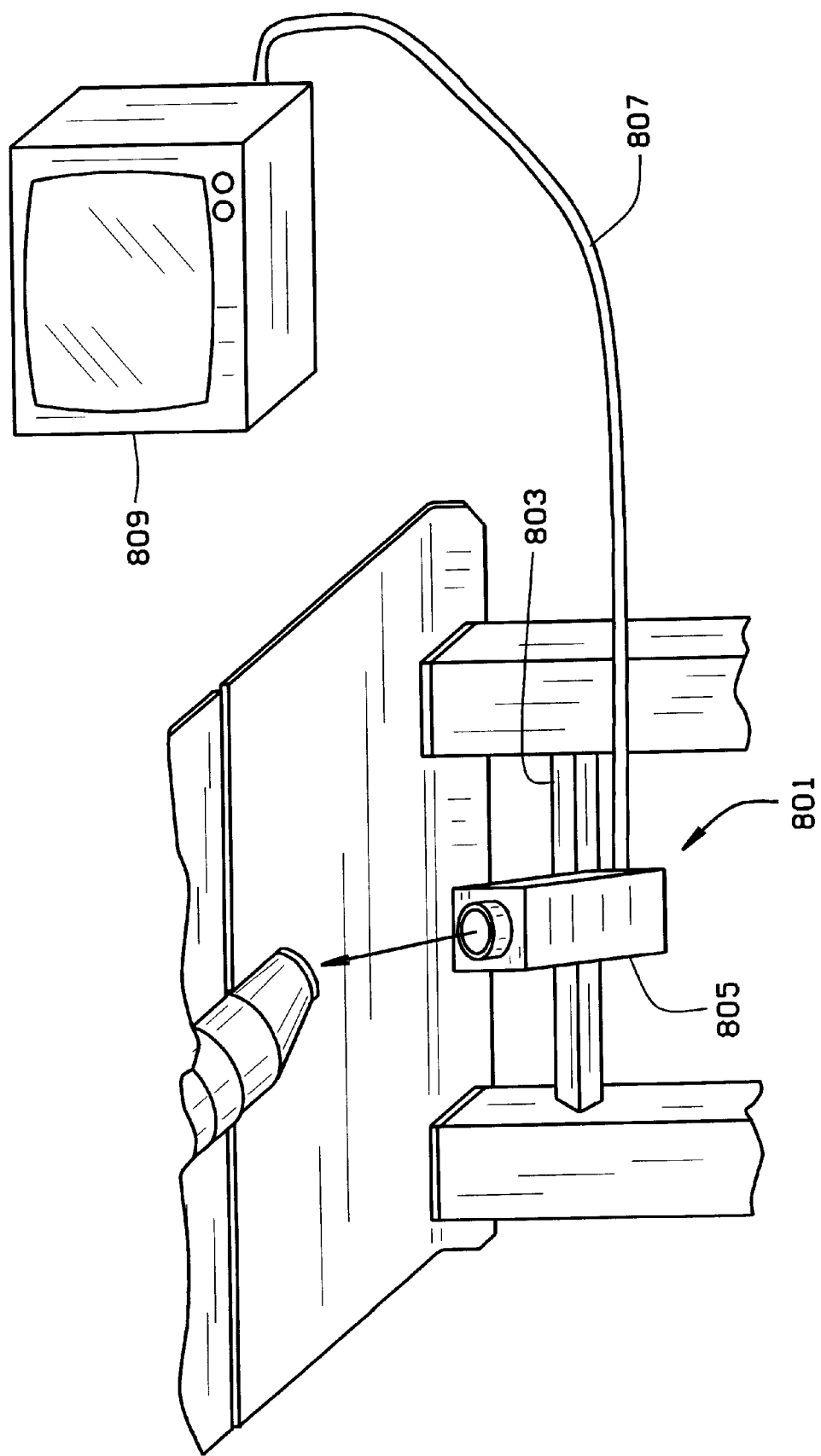
FIG. 8, a bottom rear view showing the underneath of the front portion of the saw of FIG. 6.

Referring now to FIG. 7 and FIG. 8, an under table inspection system 801 is shown. System 801 includes a crossbar 803, a video camera 805, video cable 807 and a monitor 809. Crossbar 803 mounts video camera 809 on saw 601 such that video camera 805 can observe the lower front of saw blade assembly 703 to assure that it is operating properly. A similar inspection system 801 could be utilized to look at the rear of saw blade assembly to see that the pork spines are being properly ejected from saw blade assembly 603 onto chute 611. The assembly could use mirrors if desired to other viewing and mounting options.

Figure 9B:
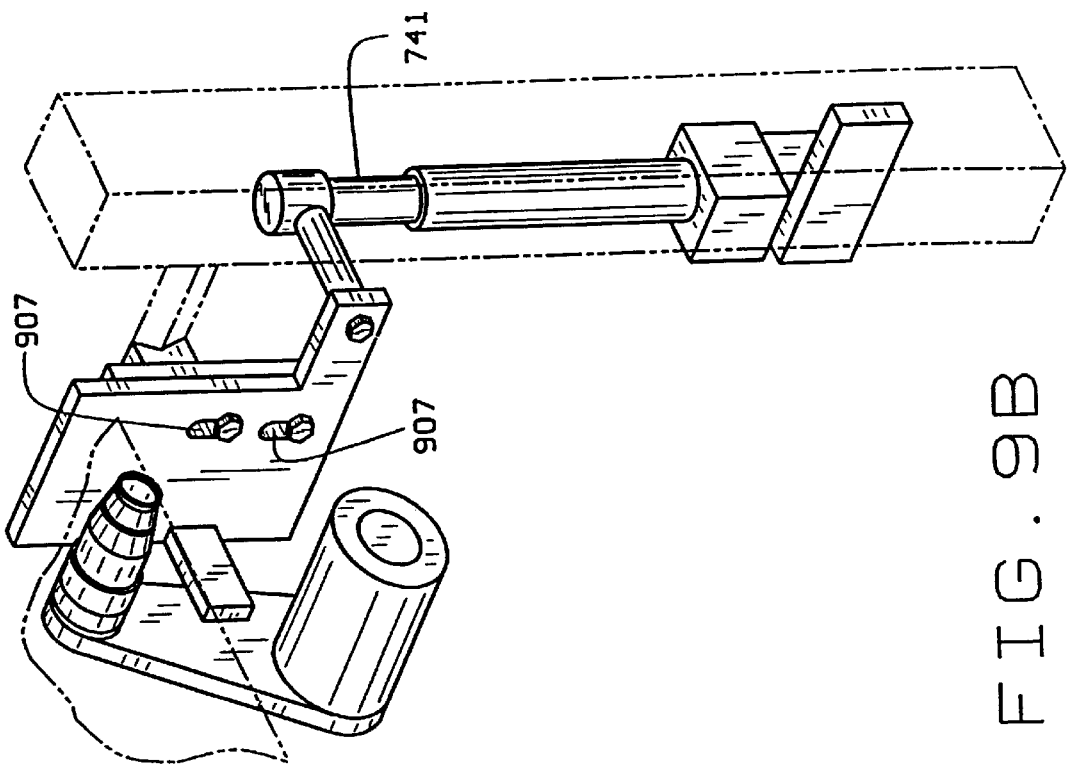
FIG. 9B, a left side front upper perspective view of the saw blade height adjustment mechanism of the saw of FIG. 6 in the highest saw blade position.
Figure 9A:
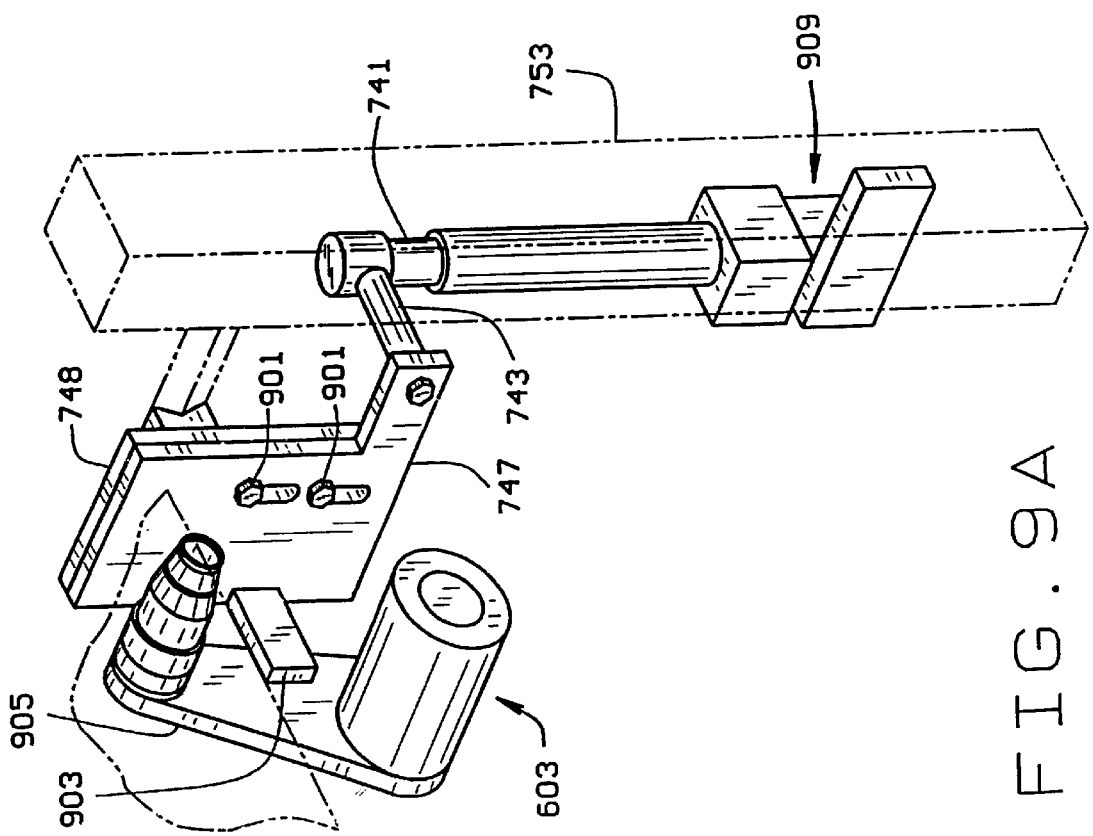
FIG. 9A, a left side front upper perspective view of the saw blade height adjustment mechanism of the saw of FIG. 6 in the lowest saw blade position.
Figure 12:
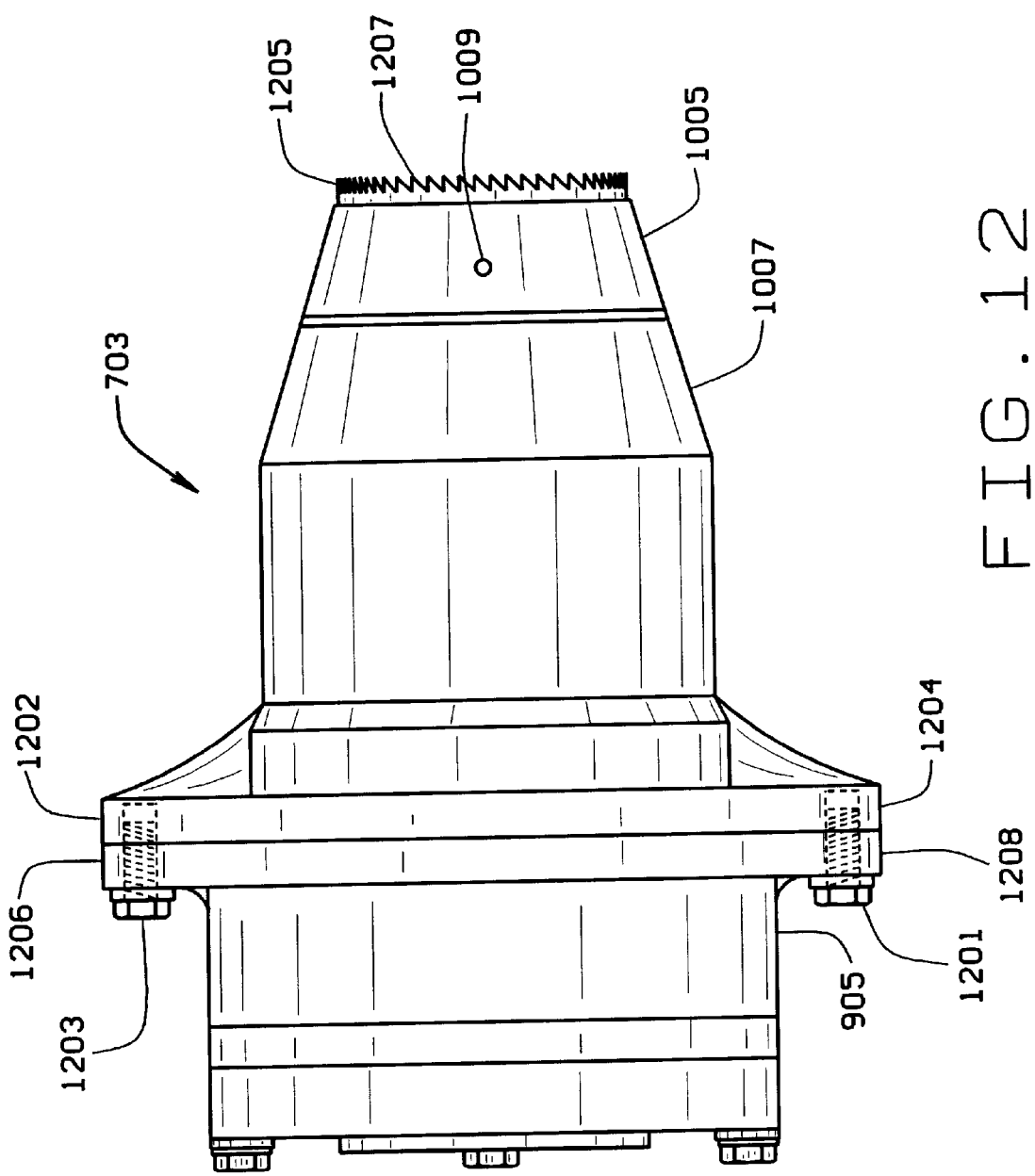
FIG. 12, a top view of the saw blade assembly of FIG. 11, taken along lines 12—12.

Looking now to FIGS. 9A and 9B, one form of height adjustment mechanism 618 will be described in more detail. This is only an exemplary form, and would likely be replaced by a hand wheel operated mechanical system similar to that used to adjust a lathe or other metal working machine, but adapted for a wash down environment. Such a hand wheel operated mechanical system will be easily envisioned by the artisan of ordinary skill in the manufacture of meat processing equipment, once the following detailed description of its mechanical equivalent is reviewed and understood. As was noted previously with respect to FIG. 7, when button 742 is depressed, telescopic post 741 is retracted, as in FIG. 9A, and cross member 743 is lowered along with connector plate 747 to the limit defined by bolts 901 attached to connector plate 748. Connector plate 747 has a cross bar 903 which is attached to a housing 905 surrounding the drive belt 701 of saw assembly 603. When button 740 is pushed, telescopic post 741 is raised, as shown in FIG. 9B, and cross member 743 and plate 747 are raised until bolts 901 reach the bottom of slots 907. This raises cross bar 903 and housing 905 to move saw assembly 603 upwardly until connector plate 747 cannot move any further. FIGS. 9A and 9B represent the lowest and highest point of the saw assembly 603, respectively. Suitable attachment 909 is provided to attach assembly 618 to leg 753. Saw assembly 603 is better seen with reference to FIGS. 10–11 showing a left side and front view of saw assembly 603. Saw blade assembly 703 has an air supply line 1001 for reasons described later with respect to FIG. 18. It is seen that the front of saw blade assembly 703 is tapered and has three parts, saw blade 1003, spindle 1005 and housing 1007. After saw blade 1003 cuts the pork spine, the tapered portions

1005 and 1007 of the spindle and housing apply pressure to the remainder of the spine and shoulder to help separate them. A small setscrew hole 1009 is seen in taper 1005 for purposes of attaching blade 1003 to spindle 1005. Motor 613 drives blade 1003 in a counter clockwise direction as shown by arrow 1101.

The structure and operation of saw blade assembly 703 will now be described in more detail with reference to FIGS. 12–15. It is seen that assembly 703 is attached to housing 905 by two bolts 1201,1203 or other conventional fastening means through two lateral projections 1202, 1204 on assembly 703 and two matching lateral projections 1206,1208 on the housing 905. The assembly 703 has a housing 107 from which protrudes a spindle 1005 and an exposed portion 1205 and saw teeth 1207 of saw blade 1003 which are held within the front of spindle 1005 by a set screw 1009. The lateral projections 1202 are tapered forwardly to help prevent the pork shoulder from hanging up on the side protrusions during passage over and around the projections.

Looking next to FIG. 13, the detailed structure of saw blade assembly 703 will be described. The saw blade assembly 703 is seen to comprise a series of coaxial tubular parts adapted to rotate the exposed portion 1003 of blade 1207 to accomplish the cutting action while allowing the object cut to pass through the center of the assembly. Assembly 703 comprises a saw blade 1003, a spindle 1005, a housing 1007, a setscrew 1009, a support tube 1335, a bearing assembly 1302, a rear cover assembly 1304, and two lip seals 1305, 1306. Blade 1205 is mounted from the inside front surface of spindle 1005 and spindle 1005 has a forward taper 1301. Setscrew 1009 holds the saw blade 1205 in position within spindle 1005. Spindle 1005 is, in turn, mounted within housing 1007 and housing 1007 has a forward taper 1303 which aligns with and matches the taper 1301 of the spindle. Bearing assembly 1302 allows for rotation of spindle 1005 within housing 1007. Bearing assembly 1302 includes a sleeve 1312 with a bearing 1307 and 1308 at the front and rear thereof, respectively. Bearing assembly 1302 is attached to external groves 1501, 1503 of the spindle to prevent axial movement of the bearing assembly relative to the spindle. These snap rings 1309, 1310 allow easy removal of the bearing assembly from the spindle for maintenance and repair. The sleeve 1312 of the bearing assembly has radial passage ways 1315 in order to allow air to enter from a block 1313 and air supply conduit 1001 into a plenum space 1311 defined between the housing 1307 and spindle 1005 between bearings 1307 and 1308, for cleansing and safety reasons described below. Spindle 1005 is in turn mounted on a stationary support tube 1335 which is connected by a weld 1343, or other suitable connection means, to a rear cover plate 1341. Plate 1341 is in turn mounted to a rear cover plate 1337 which is in turn attached to the rear of housing 905 and housing 1007 by a bolt 1333 and bolt 1339. A gasket 1323 and seals 1325 and 1337 seal between housing 905 and housing 1007 and rear cover plate 1337 in order to prevent meat cuttings or other debris from entering plenum 1311 in order to lengthen the life of bearings 1307 and 1308. Clean air enters in the direction shown by arrow 1316 through conduit 1001 and block 1313 through passageway 1314 and 1315 into plenum 1311. The air then flows as indicated by arrows 1317,1318,1319,1320 and 1321 and then exits through eyebrow 1326 between the inside front of housing 1007 and the outside of spindle 1005. Reverse groves 1324 can be provided on the front exterior of spindle 1005, to act like the exit screw of a meat grinder to force meat back out of saw assembly should any enter during cutting. In practice, it has been found that the eyebrow and air purge are sufficient to keep meat from entering without the need for the reverse grooves. The purpose of the reverse groves is to assist in driving any meat cuttings, fluids or other debris forwardly out of groves 1324 and thus away from the plenum 1311. This forward flow is encouraged by the pressurized air flowing forwardly through groves 1324. Lip seals 1305 and 1306 complete the enclosure of plenum 1311 while allowing air to escape toward the ends of the spindle as just described. It is seen that only the spindle and saw blade rotate under the motive force of drive belt 701. Support tube 1335 and housing 107 are stationary so that only the portion forward of taper 1303 is rotating, thus minimizing the lateral forces on the work piece. This makes it much easier to hold the work piece on the table.

Figure 13:
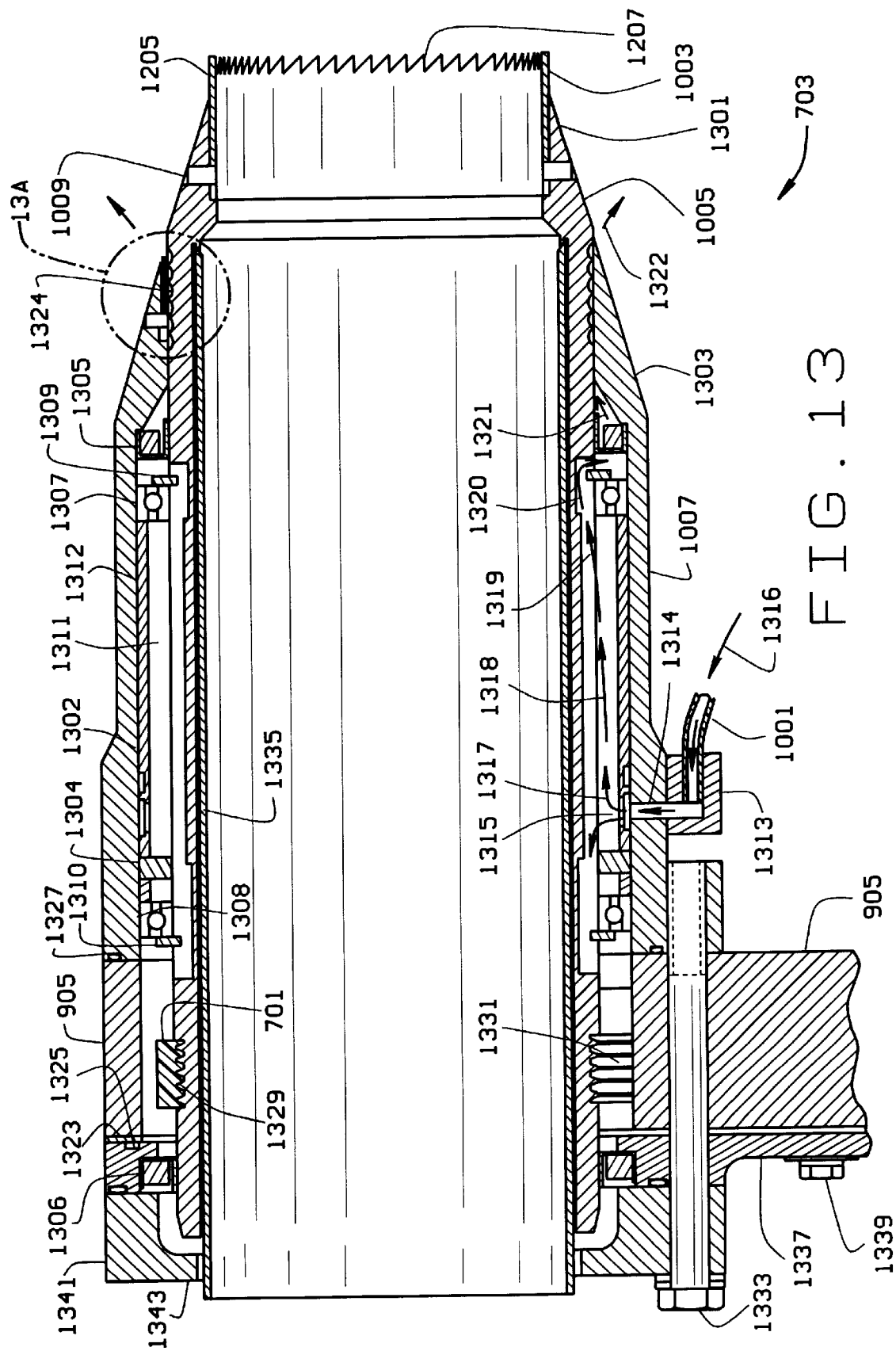
FIG. 13, a side cross-sectional view taken along lines 13—13 of FIG. 1 1.
Figure 14:
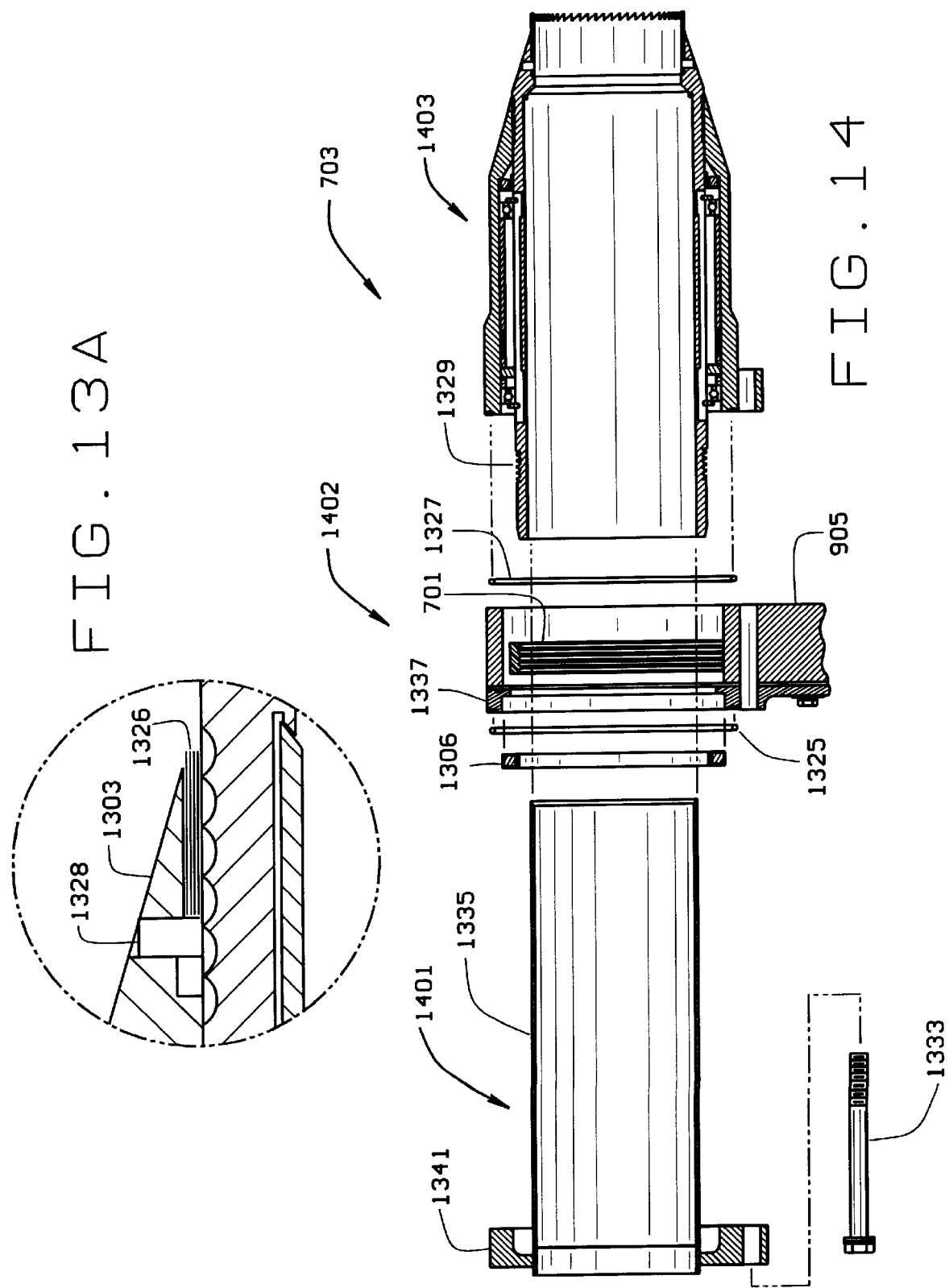
FIG. 14, a side cross-sectional view of the saw blade assembly of FIGS. 10–13, showing the parts separated and aligned for assembly.
Figure 15:
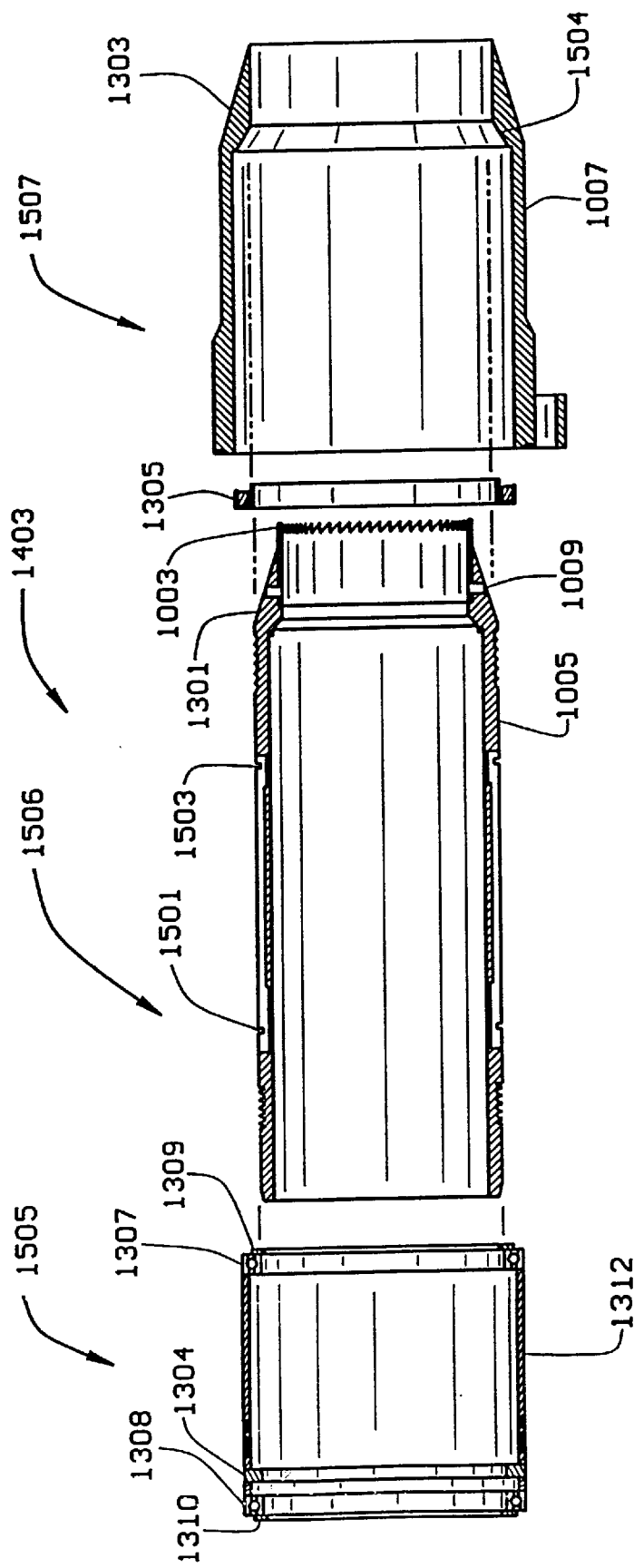
FIG. 15, a side cross-sectional view of the front portion of the saw blade assembly of FIG. 14, showing the saw blade housing and saw blade separated for assembly.

Referring next to FIG. 14, the assembly of the saw blade assembly will be described. Saw blade assembly 703 comprises a rear support tube section 1401, a mid-drive section 1402 into front separation section 1403. Support tube section 1401 includes the support tube 1305 and the rear cover plate 1341 which are, as previously noted, fastened together by welding or otherwise. Mid drive section 1402 includes drive housing 905, belt 701, rear cover plate 1337, front and rear seals 1327, 1325 and rear lip seal 1306. Front separation section 1403 is assembled in the manner shown in FIG. 15. Separation section 1403 includes mid section 1505, inner section 1506 and outer section 1507. Inner section 1505 is the bearing assembly 1302 of FIG. 13 and comprises front and rear bearings 1307, 1308, spacer 1304, sleeve 1312 and front and rear snap rings 1309,1310. Inner section 1506, in turn, comprises spindle 1005, saw blade 1003 and setscrew 1009. Annular groves 1501 and 1503 are provided at the rear and front, respectively, of the mid section of spindle in order to receive snap rings 1310 and 1309 in order to hold the mid section 1505 on the outside of spindle 1007. Once the mid section 1505 is attached to the inner section 1506 lip seal 1305 is placed over the front of spindle 1005 and the assembled inner and mid sections 1505, 1506 are inserted forwardly into the rear of outer section 1507 or housing 1007 until lip seal 1305 comes to rest against a rearwardly facing shoulder 1504 on the interior of housing 1007, at which time the assembly of separation section 1403 is complete. Spindle 1005 includes a taper 1301 at its front outer surface and housing 1007 includes a matching taper 1303 at its front outer surface in order to assist in the separation process. When assembled, as shown in FIGS. 13 and 14, these tapers match to produce a uniform taper from saw blade 1003 to the outer surface of the mid section of housing 1007. This taper applies a separation pressure between the core and the remainder of the work piece in order to tension the connection between the core and the work piece at the point where it is being cut by teeth 1207 of saw blade 1205.

Figure 16:
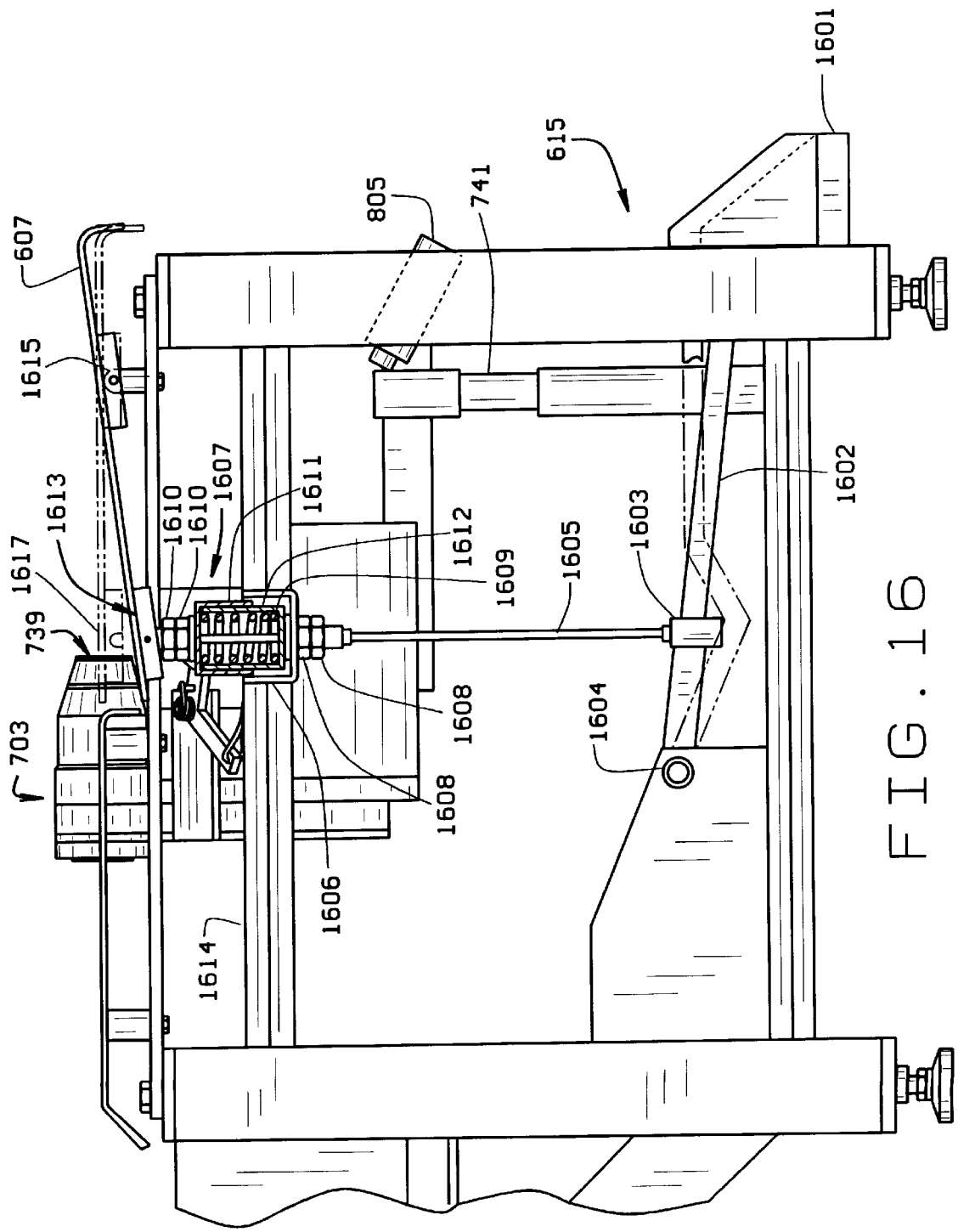
FIG. 16, a left side view of the saw of FIG. 6 to better show the table drop mechanism of the saw.
Figure 17:
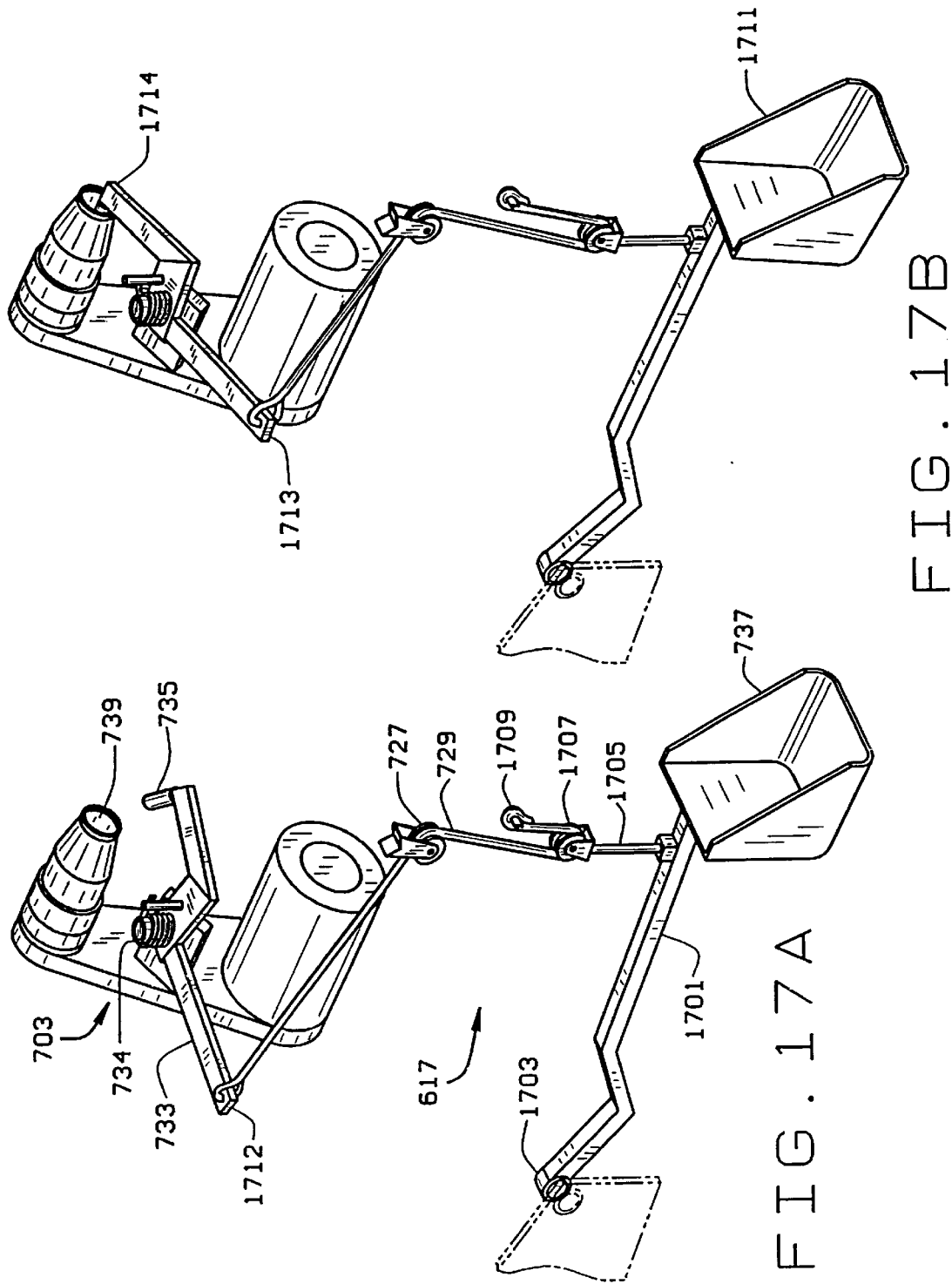
FIG. 17A, left front upper perspective view of the bone knocker mechanism of the saw of FIG. 6, in its normal retracted or front position.
FIG. 17B, a left front upper perspective view of the bone knocker mechanism of the saw of FIG. 6, in inserted or rear position, with pedal depressed.

The operation of the "table drop" mechanism 615 will now be described with reference to FIG. 16, a left side elevational view. Before discussing the table drop mechanism, it is noted that the saw assembly is shown horizontal, but would preferably be tilted forward a minimum of eight degrees, to cause the saw to better closely follow the core as it is cut. Table drop mechanism 615 includes pedal 1601, pedal bar 1602, rod connector 1603, pivot 1604, rod 1605, compression spring 1607, and connector 1613. While a pedal operated mechanical system is shown, it is preferable to have a pneumatic operated table drop, controlled by a foot button, so as to minimize the complexity of the exposed portions and prevent debris from entering the mechanism or parts from corroding. Such a pneumatic system could use disposable stainless steel air cylinders with DELRON ends and speed controls in both directions. Such a system will be easily envisioned by the artisan of ordinary skill in the manufacture of meat processing equipment, once the following detailed description of its mechanical equivalent is reviewed and understood. Compression spring 1607, in turn, comprises a coil spring 1609, a pair of lower lock nuts 1608, a pair of upper lock nuts 1610, and upper cup 1611 and a lower cup 1612, the lower cup being telescopically mounted within the upper cup to allow vertical movement there between. Compression spring 1607 is shown in its compressed condition with table 1607 tilted rearwardly down or "dropped."0 Table drop mechanism 615 also includes a pivot 615 to allow rotation of section 607 relative to the remainder of the saw between the lower position shown and an upper position 1617 located at an intermediate height relative to saw assembly 703. It will be understood that when pedal 1601 is depressed, pedal bar 1602, connector 1603, rod 1605 and upper cup 1611 are lowered. Lower cup 1612 is mounted in a bracket 1606 attached to a rigid member 1614 of despiner 601. A downward movement of rod 1605 pulls connector 1613 and the rear portion of table 607 down until upper and lower cups 1611 and 1612 come together and can move no further. This lower position is determined by the size of the enlarged portion of the core of the work piece to enable the enlarged portion to pass into the front opening 739 of saw assembly 703. Once the enlarged portion has entered opening 739 and thus been separated from the work piece, pedal 1601 is released and spring 1609 drives the upper cup 1611 and with it the connector 613 and the rear of table 607 back upwardly to the horizontal position 1617 or other upper position as pre-determined in order to allow the remaining smaller core to be removed without excessive loss of work piece material adjacent to the core. This raising of the table 607 is worth a tremendous amount of money to the meat processing industry since meat left attached to the pork shoulder is worth significantly more than meat attached to the spine, which is "robbed" from the spine and ends up in sausage or the like. The telescopic post 741 of the vertical height adjustment mechanism 618 is seen as well as the video camera 805. This mechanism 615 is shown as pedal operated. In actual operation it might be preferred to automate the table drop mechanism so that it can be operated by a simple button, not shown, similar to buttons 740, 742. This could be coordinated with the saw starting function, so that the saw blade starts spinning when the table is inclined, and the table drop button could be foot operated to free the operator's hands. The saw blade could be stopped by an ultrasonic sensor 1935 (see FIG. 19) which detects presence of the pork shoulder on the table and interrupts the power to the saw when presence is not detected. One suitable ultrasonic sensor might be a Banner Engineering 45UL IU64BCRQ. Alternately, one or more photocells, weight sensors, timers, gates or other sensors might be used to sense the presence or absence of a pork shoulder on tables 607,609. Thus, for example, it might be preferred to substitute foot operated push buttons for the pedals in both the table drop mechanism 615 and the bone knocker mechanism 617.

Next, with reference to FIGS. 17A and 17B, the "core knocker" or "bone knocker" mechanism 617 will be described. Again, this is a mechanical, foot lever operated system that could be replaced with a pneumatic or hydraulic system operated by a hand button or foot button, if desired. It is likely that most operators would, in fact, prefer a pneumatic system, and an air supply is readily available in view of the air purging used in the saw assembly and previously described. Such a system will be easily envisioned by the artisan of ordinary skill in the manufacture of meat processing equipment, once the following detailed description of its mechanical equivalent is reviewed and understood. The system shown is thus exemplary and not limiting of the scope of the invention. Bone knocker assembly 617 includes pedal 737, pedal bar 1701, pivot 1703, lower cable 1707, lower pulley 1707, attachment loop 1709, cable 729, upper pulley 727, pivot arm 733, rotary spring 734, and finger 735. When pedal 737 is in its normal upper position as shown in FIG. 17A, finger 735 is in its forward retracted position spaced from opening 739 of saw blade assembly 703. However, when pedal 737 is in its lower position 171 1, lower pulley 1707 is lowered and with it cable 729 to pull pivot arm 733 counterclockwise toward a front position against the bias of rotary spring 734 to pull finger 735 rearwardly to a position 714 with finger 735 in opening 739. When pedal 737 is released, rotary spring 734 returns pivot arm 733 from its forward position 1713 to its rear position 1712. Pressing on pedal 737 knocks any core or bone out of opening 739, hence the term "bone knocker."

Figure 18:
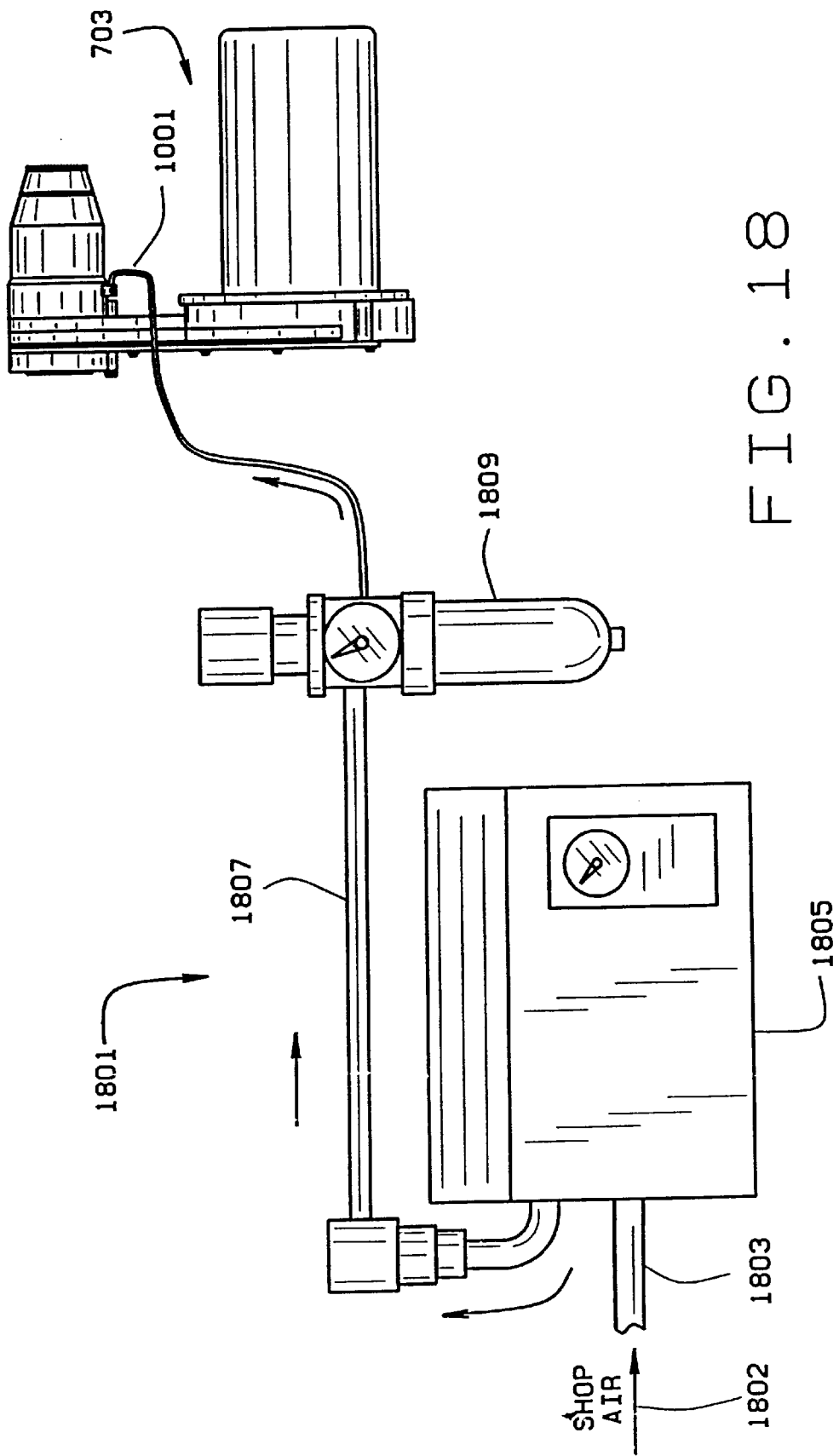
FIG. 18, a left side view of the air purging system of the saw of FIG. 6, with other parts of the saw eliminated for better clarity.
Figure 19:
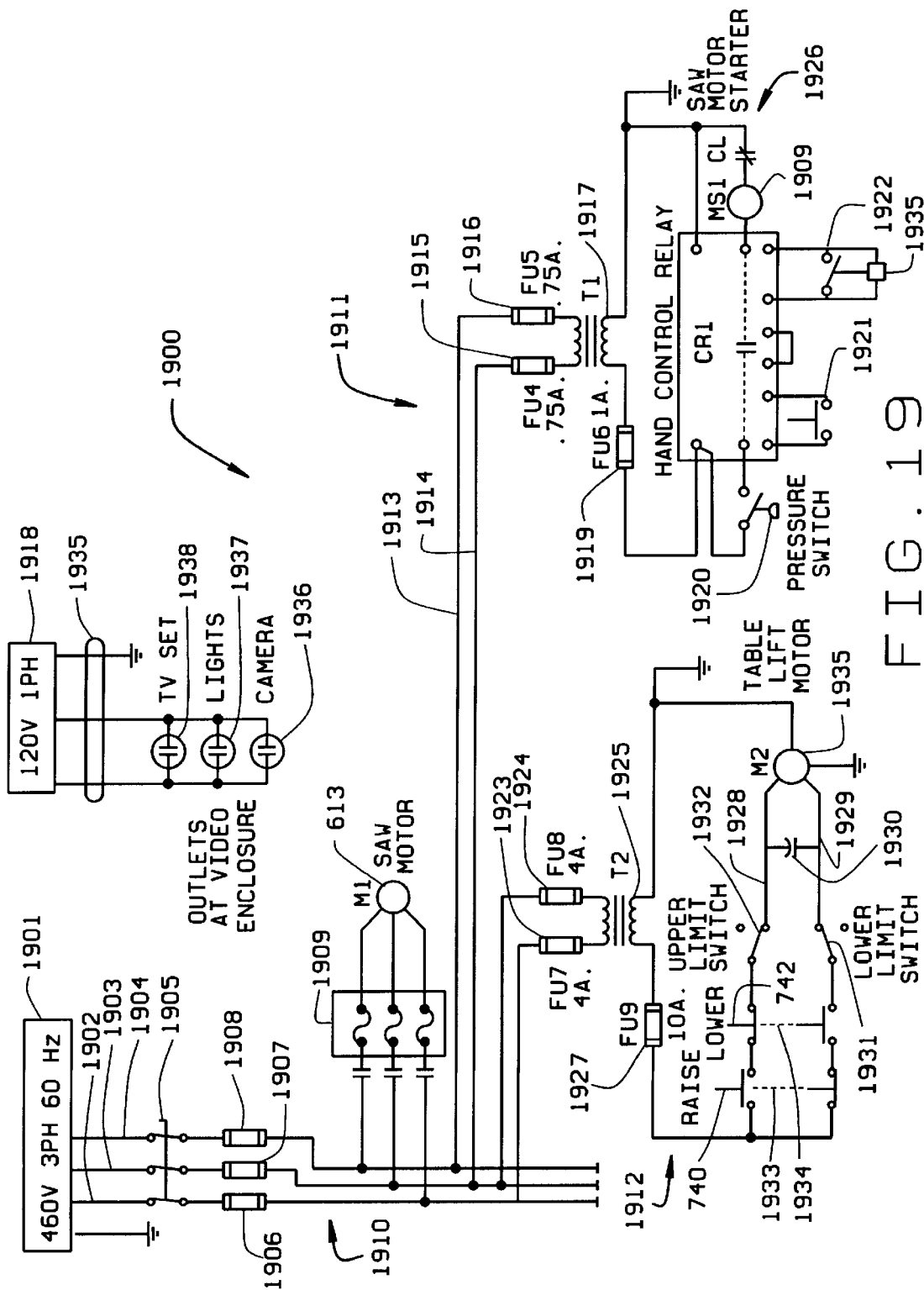
FIG. 19, a schematic diagram of the electrical system of the saw of FIG. 6, showing the safety controls for saw motor and table motor.

Referring now to FIG. 18, the air supply system for pressurizing air plenum 1311 will be described. This air supply system 1801 includes an air supply 1802, an inlet line 1803, an air cleaner 1805, a clean air conduit 1807, a pressure regulator 1809, and a saw air supply conduit 1001 attached to saw blade assembly 703. This air supply is preferably constantly on to assure that there is a constant airflow into, through and out of plenum 1311 to prevent debris and contaminates from entering plenum 1311.

In order to power the saw 601 and to provide safety features, an electrical supply system 1900 is provided. System 1900 controls the connection of two electrical current sources 1901 and 1918 to the saw 601. Current supply 1901 is a 460 volt, three phase, 60 hertz power supply, while power supply 1918 is a standard 120 volt, single phase household current source. Both sources 1901, 1918 are grounded. Source 1901 is connected through three power supply lines 1902,1903 and 1904 via a disconnect switch 1905 and three fuses 1906,1907, 1908 to saw motor 613 through a master switch 1909 to form a motor power supply circuit 1910. Lines 1902 and 1903 are connected to a table lift circuit 1912 while lines 1903 and 1904 are connected to a saw start circuit 1911. Each of these circuits is optional, since the table lift system could be easily replace by a hand crank mechanism (not shown) for more precise height adjustment and the saw motor could be started and stopped by any number of different systems such as a photocell, push button, lever, timer, or the like. Saw start circuit 1911 is shown at the lower right of FIG. 19 while table lift circuit 1912 is shown at the lower left of FIG. 19. Referring first to saw start circuit 1911, it is seen that lines 1904 and 1903 are respectively connected by lead wires 1913 and 1914, respectively to a transformer 1917 by way of two fuses 1916 and 1915. Transformer 1917 in turn connects a saw motor starter 1926 through fuse 1919, pressure switch 1920 which would sense dropping of front table section 607, push button switch 1921, ultrasonic sensor switch 1922, and master switch 1909. Thus, when pressure switch 1920, and switches 1921 and 1922 are all closed, saw motor starter 1926 is powered so that master switch 1909 is activated to turn on the saw motor 613 to apply power through drive belt 701 to spindle 1005 and thus to saw blade 1003. Switch 1922 is controlled by an ultrasonic sensor 1934 which detects the presence or absence of the pork shoulder and closes swithch 1922 only when the pork shoulder is present so that the saw spindle rotates only when a pork shoulder is present on the table 607 or 609. Similarly, if a power saw height adjustment is used rather than a hand crank adjustment, lines 1902 and 1903 are connected through fuses 1923 and 1924 to a transformer 1925. Transformer 1925 in turn is connected through fuse 1927, and either raise power line 1928 or lower power line 1929, selectively, to table lift motor 1935 to raise or lower saw assembly 703 by extending or retracting telescopic post 741. Raise power line 1929 includes a portion of raise button 740, a portion of lower button 742, and an upper limit switch 1932. Lower power line 1929 includes lower portion 1933 of raise switch 740 and lower portion 1934 of lower switch 742 as well as lower limit switch 1931. When raise switch 740 is depressed, lower power line 1929 is disconnected and raise power line 1929 is connected and when raise button 740 is not depressed, lower power line 1929 is connected and raise power line 1928 is disconnected. When lower button 742 is depressed, lower power line 1929 is connected and raise power line 1928 is disconnected, and when lower button 742 is not depressed raise power line 1928 is connected and lower power line 1929 is disconnected. If both raise and lower buttons are depressed at the same time or neither is depressed, both power lines 1928 and 1929 are disconnected. Capacitor 1930 is provided to balance the system. Additionally, an upper limit switch 1932 is provided to disconnect raise power line 1928 when the saw reaches its upper position and lower limit switch 1931 is provided to disconnect lower power line 1929 when the saw blade assembly reaches its lower limit, thus preventing damage to table lift motor 1935. If a hand crank were used, the limit feature would simply be provided by limiting the travel of the crank within a certain range. Finally, standard electrical plugs 1936, 1937 and 1938 are connected through a master switch 1935 to allow camera, lights and monitor to be powered selectively.

Thus we see presented in this invention a structure adapted to provide a method of safely, quickly and accurately decoring a work piece. Although other work pieces might be decored using the invention, the particular work piece is shown as a pork shoulder and the decoring is removing the neck bone from a pork shoulder.

Where the decoring is of a neck bone from a pork shoulder, the neck bone saw is designed to cut only the rib and featherbones to thereby separate and remove the spine from the shoulder. If properly operated there should be a minimum of bone chips and a minimum of meat removed. The neck bone saw should not cut the backbone, but rather just separate the backbone from the shoulder. The pork shoulder despining process involves nine basic steps, which will be described.

First, the operator places a pork shoulder 301 on the front table section 607 with the Atlas bone 503 nearest the saw blade 1003. This will automatically enables sensor 1935 and switch 1922, but the saw spindle 1301 remains stationary.

Second, the operator adjusts the height of the saw blade assembly 703 above or below the horizontal centerline of the table depending upon the amount of bone that is in each shoulder. This is either done with buttons or a hand wheel assembly. The saw has been found to work well with a total travel of 1.50 inch (approximately ¾ of an inch up or ¾ of an inch down from the normal setting.) The two buttons 740, 742 on the front of the saw near the upper right hand side are used for this adjustment. Alternately, a hand wheel mechanism can be used. The reason this adjustment is necessary is because the pork carcasses vary in size and are not always split exactly down the middle of the backbone. More or less of the bone may be present in each shoulder. Adjusting the height of the saw facilitates removal of the backbone with a minimum of meat attached depending upon the amount of bone present.

Third, the operator depresses the right foot pedal 1601 which tilts the back of front table 607 down about 10 degrees adjacent the saw blade to facilitate proper alignment and cutting of the Atlas joint. The Atlas joint is the first vertebra after the skull and is somewhat larger than the other vertebrae. This step could be automated by using a pneumatic system activated by a foot button. The lowering of the table would automatically close switch 1920 to power the saw motor to start the saw blade spinning.

Fourth, the operator pushes a button to start the saw. As noted, the preferred way of doing this is to have the lowering of the table depress a button to start the saw. This button would not do anything when released except reset, so that the saw would keep running when the table is raised back to its former position as long as there is a pork shoulder on the table.

Fifth, after the Atlas joint has gone into the center of the circular saw (to avoid blade contact), the operator takes his foot off of the right foot pedal 615, 1601 or otherwise deactivates the table drop. The front table 607 immediately returns to a horizontal position 1617 as the saw continues spinning and cutting and the operator then pushes the rest of the shoulder through the saw.

Sixth, the operator looks at monitor to view the spinning saw from the bottom, and confirm that the pork shoulder has cleared the saw and the saw is clear and that the spine is in the tubular center support 1335, thus confirming successful removal of the spine. Seventh, after the neck bone 501 has been removed from the shoulder the operator pushes the pork shoulder off the rear of the table 609 to deactivate sensor 1935 and open switch 1922 to stop the saw.

Eighth, the operator then depresses the left foot pedal 617, 737 which actuates the bone knocker 617. Alternately, a foot button is depressed to activate a pneumatic system to actuate the bone knocker. This apparatus inserts a mechanical finger 735 into the front opening 739 of the saw blade to clear the neck bone 501 from the saw blade 1205 and pushes it into the support tube 1335 of the saw. As a new neck bone is pushed back into the support tube it pushes the previous neck bone out the back onto a chute 611 as gravity feeds it into box 2008 or onto a conveyer (not shown).

Ninth, the pork shoulder is gravity feed through a tilted discharge chute 611 to a conveyor or other means for moving the shoulder to further processing operations. The machine is then ready to receive the next pork shoulder.

Referring now to saw design, the assembly circular saw 703 has an exposed spinning cutting head 1003, 1301 of about 1½ inches in length. The remainder of the saw is stationary, and is mounted to the belt housing 905. A motor 613 is mounted under the table and is connected to the rotary saw with a grooved belt 701. The belt is sheltered inside the belt housing and therefore not exposed to the fresh meat. Positive air pressure is directed to a plenum 1311 on the inside of the saw assembly, between spindle 1005 and housing 1007, to keep the ball bearings 1307, 1308 dry and to keep debris out.

In its broad aspects, the invention provides a method of removing a core with an enlarged portion from a work piece. The steps used in this decoring are first positioning the work piece on a table in front of a saw blade having an upwardly arched cutting blade defining an opening thereunder, the table being at an intermediate level relative to the opening so as to define a portion of the saw blade opening above the table suitable to receive the large portion of the core; and then pushing the large portion of the core of the work piece into the saw blade opening while cutting around the large portion of the core with the saw. It has been shown in the drawings how this is embodied in a pork shoulder despiner.

The method would optimally, further comprise the step of reducing the portion of the saw blade opening above the table once the large portion of the core has been cut and then more closely cutting the remainder of the core from the work piece with the saw blade, thereby reducing the height of the portion of the work piece cut once the large portion of the core has been cut from the work piece to thereby minimize the amount of meat loss. Preferably, the saw blade is tubular and the portion of the opening is reduced by lowering the saw relative to the table. It is also desirable that the portion of the opening is reduced by raising at least a section of the table and we have found it useful for the section of the table raised to be the front section. When the front section of the table is rearwardly downwardly inclined, as seen if FIG. 16, the raising of the table is accomplished by reducing the downward tilt of the rear of the front portion of the table adjacent the saw blade, thereby raising it back to a desired higher position such as the level position shown in dotted lines in FIG. 16.

The rear section of the table is either level or upwardly inclined toward the rear. Upward inclination of the rear table can help in locating the pork shoulder or other similar work piece with its enlarged portion in the opening of the table saw.

As best seen in FIG. 18, FIG. 10, and FIG. 13, the method of the invention optionally includes the step of pressuring a space between a housing and the saw blade to help prevent work piece cuttings from entering the space. This is particularly desirable where the work piece is a pork shoulder or other meat item which might produce organic body fluids when cut. Such fluids or other meat cuttings tend to spoil over time, and thus pose a cleanliness problem if allowed to accumulate in processing equipment. The air cleansing can minimize that problem by forcing such biodegradable meat parts out of the saw.

The method further optionally and desirably includes inserting a core remover into the saw blade opening to remove a core from the opening prior to positioning of another work piece on the table. This helps prevent jamming of the saw blade opening, which would require maintenance.

To prevent lateral forces on the work piece which would make it more difficult to manhandle a work piece during decoring, the method preferably includes the step of covering a major portion of the outer surface of the saw blade by a stationary housing to reduce lateral forces of the saw upon the work piece and also includes the step of covering a major portion of the inner surface of the saw blade by a stationary housing to reduce lateral forces of the saw upon the work piece.

As seen in FIG. 8, the method of the invention optionally and desirably includes the step of observing the lower rear of the saw to determine if the core has been successfully removed from the work piece, and this preferably is done by video camera and remote monitor.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A decoring saw, comprising:
    a) saw blade having an upwardly arched cutting surface defining an opening thereunder;
    b) a table having a front and rear table portion where said front table portion is substantially disposed in front of the cutting surface and the opening thereunder and is substantially perpendicular to the opening at an intermediate level thereof defining a portion of the opening above the front table portion and said rear table portion substantially disposed rearwardly of the cutting surface; and
    c) a table drop mechanism operatively attached to the front table portion and adapted to adjustably decline a rear most end of the front table portion closest the opening thereby varying the amount of the portion of the opening above the level of the rear-most end.

2. The decoring saw of claim 1, wherein the the table drop mechanism is adapted to be controllably actuated responsive to an input and the rear table portion is adapted to upwardly incline toward the rear.

3. The decoring saw of claim 2, wherein the table drop mechanism is adapted to be controllably actuated by a foot pedal.

4. The decoring saw of claim 2, wherein the table drop mechanism is actuated automatically.

5. The decoring saw of claim 4, further comprising a stationary housing covering the top of the arched portion of the saw blade and an air purge system adapted to pressurize a space between the housing and the blade to help force cuttings out of the space.

6. The decoring saw of claim 2, further comprising a core knocker mechanism operatively attached to the table, adapted to clear a core from the opening following cutting.

7. The decoring saw of claim 1, where the core knocker mechanism is an elongated finger member adapted to controllably be inserted into the opening.

8. The decoring saw of claim 7, wherein the core knocker mechanism is actuated by a foot control pedal.

9. The decoring saw of claim 7, wherein the core knocker mechanism is actuated automatically.

10. The decoring saw of claim 1, further comprising a stationary housing covering the top of the upwardly arched cutting surface of the saw blade and an air purge system adapted to pressurize a space between the housing and the blade to help force cuttings out of the space.

11. The decoring saw of claim 1, where the stationary housing covers the saw blade from an area of the saw blade immediately rear a forward cutting edge to a rear most end.

12. The decoring saw of claim 11, further comprising a support tube covering a rear and medial inner surface of the saw blade.

13. The decoring saw of claim 1, further comprising a support tube covering a rear and medial inner surface of the saw blade.

14. The decoring saw of claim 1, wherein the blade is rigid.

15. The decoring saw of claim 14, wherein the blade is tubular.

16. The decoring saw of claim 15, wherein the saw blade further comprises:
    a cutting edge immediately forward a front portion and defining a frontal opening;
    an enlarged diameter medial portion; and
    a tapered front portion connecting the front and medial portion, which promotes separation of severed portions of a work-piece.

17. The decoring saw of claim 15, further comprising a stationary housing covering the tubular saw blade and an air purge system adapted to pressurize a space between the housing and the blade to help force cuttings out of the space.

18. The decoring saw of claim 17, further comprising a stationary tubular support tube inside the saw blade and covering a major rear region of the inner surface of the blade and leaving exposed only the saw teeth and an adjacent front region of the blade immediately adjacent the saw teeth.

19. The decoring saw of claim 1, wherein the saw blade further comprises a tubular spindle, a circular blade mounted in the front of the spindle and a fastener to hold the circular blade in the spindle.

20. The decoring saw of claim 19, further comprising a support tube covering a rear and medial inner surface of the saw blade and wherein the support tube has a larger internal diameter than the circular blade.

21. The decoring saw of claim 1, wherein the saw blade is adapted with a level adjustment mechanism adapted to vary the vertical level of the saw blade relative to a table level.

22. The decoring saw of claim 21, wherein the level adjustment mechanism for raising and lowering is actuated by a foot operated pedal.

23. The decoring saw of claim 21, wherein the level adjustment mechanism for raising and lowering is actuated automatically.

24. A tubular saw for removing cores, comprising:
   a) a saw blade having an upwardly arched cutting surface defining an opening thereunder;
   b) a housing covering a major rear portion of the blade, so that only a saw teeth portion and a front portion immediately adjacent to the saw teeth portion is exposed, thereby minimizing movement of a shoulder from which a core is being removed that may be due to the movement of the saw blade during cutting; and
   c) a positively pressurized plenum defined between the saw blade and the housing covering to prevent debris from entering the plenum.

25. The tubular saw of claim 24, wherein said saw blade and housing are tubular.

26. The tubular saw of claim 25, further comprising a stationary tubular support tube inside the saw blade and covering a major rear region of the inner surface of the blade and leaving exposed only the saw teeth and an adjacent front region of the blade immediately adjacent the saw teeth.

27. The tubular saw of claim 25, further comprising a drive belt around the rear portion of the saw blade and adapted to rotate the saw blade.

28. The tubular saw of claim 27, wherein the belt and blade have matching circumferential grooves to prevent axial slippage.

29. The tubular saw of claim 26, further comprising a drive chain around the rear portion of the saw blade disposed rear of the pressurized plenum and enclosed in a drive chain housing protected from debris and said drive chain being adapted to rotate the saw blade.

30. The tubular saw of claim 26, wherein the saw blade further comprises a tubular spindle, a circular blade mounted in the front of the spindle and a fastener to hold the circular blade in the spindle.

31. The tubular saw of claim 30, wherein the circular blade is mounted on the inside of the spindle.

32. The tubular saw of claim 30, wherein the support tube has a larger internal diameter than the circular blade.

33. The tubular saw of claim 30, wherein the spindle extends forwardly out of the housing.

34. The tubular saw of claim 30, wherein the spindle is forwardly tapered.

35. The tubular saw of claim 34, wherein the housing is forwardly tapered.

36. The tubular saw of claim 35, wherein the taper of the housing and spindle are aligned to form a continuous taper.

37. The tubular saw of claim 30, further comprising a drive belt around the rear portion of the spindle disposed rear of the pressurized plenum and enclosed in a drive chain housing protected from debris and said drive belt being adapted to rotate the spindle.

38. The tubular saw of claim 24, wherein the saw blade is a band saw.

39. The tubular saw of claim 29, further comprising a source of pressurized air connected to at least a portion of the plenum between the housing and saw blade and having sufficient pressure to force any cuttings out of the plenum between the housing and blade creating a positively pressurized air space.

40. A method of removing a core portion with an enlarged portion from a work piece, comprising:
   a) positioning the work piece on a front table portion in front of a saw blade having an upwardly arched cutting blade defining an opening thereunder, the table being at an intermediate level relative to the opening so as to define a portion of the saw blade opening above the table suitable to receive the large portion of the core;
   b) varying the level of the rear most end of the front table portion immediately in front of the opening, by selectively tilting the rear-most end of the front table portion down from a substantially horizontal position, thereby increasing the size of the opening above the front table portion;
   c) advancing the work piece toward the opening defined by the saw blade and aligning the core of the work piece with the saw blade opening and continuing to advance the work piece into the saw blade while cutting around the large portion of the core with the saw.

41. The method of removing a core of claim 40, further comprising the step of:
   varying selectively the level of the rear most end of the front table portion thereby varying the portion of the saw blade opening above the table once a portion of the core has been cut and then cutting the remainder of the core from the work piece with the saw blade, thereby varying the height of the portion of the work piece cut once the portion of the core has been cut from the work piece to thereby minimize the amount of meat loss.

42. The method of removing a core of claim 40, wherein cutting is with a tubular saw blade.

43. The method of removing a core of claim 40, wherein the portion of the opening above the table is reduced by lowering the saw relative to the table.

44. The method of removing a core of claim 40, wherein the portion of the opening is reduced by raising at least a section of the table.

45. The method of removing a core of claim 43, wherein the section of the table raised is the front section.

46. The method of removing a core of claim 44, wherein the front section of the table is rearwardly downwardly inclined and the raising of the table is accomplished by reducing the downward tilt of the rear of the front portion of the table adjacent the saw blade.

47. The method of removing a core of claim 44, wherein the rear section of the table is level.

48. The method of removing the core of claim 44, wherein the rear section of the table is upwardly inclined toward the rear.

49. The method of removing a core of claim 40, further comprising the step of pressurizing an air space between a housing and the saw blade to help prevent work piece cuttings from entering the space.

50. The method of removing a core of claim 40, wherein the removing of a core from a work piece is the removing of a core from a pork shoulder and the core is the spine and the large portion is the atlas core.

51. The method of removing a core of claim 40, further comprising the step of selectively inserting a core remover into the opening to remove a core from the opening prior to positioning of another pork work piece on the table.

52. The method of removing a core of claim 40, where positioning of the work piece on a table is positioning the work piece in front of a saw blade having a covering over a major portion of the outer surface of the saw blade by a stationary housing to reduce lateral forces of the saw upon the work piece.

53. The method of removing a core of claim 50, where positioning of the work piece on the table is positioning of the work piece in front of a saw blade having a covering over a major portion of the inner surface of the saw blade by a stationary housing to reduce lateral forces of the saw upon the meat portion being.

54. The method of removing a core of claim 40, where positioning of the work piece on a table is positioning the work piece in front of a saw blade having a covering over a major portion of the inner surface of the saw blade by a stationary housing to reduce lateral forces of the saw upon the work piece.

55. The method of removing a core of claim 40, further comprising the step of observing the lower rear of the saw to determine if the core has been successfully removed from the work piece.

56. The method of removing a core of claim 53, wherein the observing step is done by video camera and remote monitor.

57. A decoring saw, comprising:
   a) a frame and a support surface attached thereto for supporting a work piece;
   b) an elongated tubular saw blade having a forward curved cutting edge on one end defining an opening arranged closely to said support surface;
   c) an outer tubular stator housing covering co-axially covering the tubular saw blade from a point immediately rear the cutting edge to an opposite end and defining a space there between and said tubular saw blade rotates within said stator housing covering on bearing members; and
   d) reverse threaded grooves on the exterior surface of the saw blade proximate the cutting edge and covered by the stator housing covering to force debris out the space between the saw blade and the stator housing.

58. The decoring saw of claim 57, further comprising:
   a positive air pressure source operatively attached to an opening to the space between the saw blade and the housing covering and said source adapted to create a positive air flow through the space between the saw blade and the housing covering to force debris out of the space.

59. The decoring saw of claim 58, further comprising:
   a mechanical finger member operatively attached to the frame by a controllable actuating mechanism and adapted to be selectively actuated to insert through the opening to push out any debris remaining in the opening.

60. The decoring saw of claim 59, where the outer stator housing further comprises:
   a forward taper to enhance the separation of a core being removed from the work piece and the work piece.

61. The decoring saw of claim 60, further comprising:
   a camera inspection system attached to the frame and arranged to view a rear opening of the tubular saw to determine if it is clear of debris.

62. A decoring saw, comprising:
   a) a frame and support surface attached thereto for supporting a work piece;
   b) an elongated tubular saw blade having a forward curved cutting edge on one end defining an opening arranged closely to said support surface; and
   c) a mechanical finger member operatively attached to the frame by a controllable actuating mechanism and adapted to be selectively actuated to insert through the opening to push out any debris remaining in the opening.

63. The decoring saw of claim 62, further comprising:
   a) an outer tubular stator housing covering co-axially covering the tubular saw blade from a point immediately rear the cutting edge to an opposite end and defining a space there between where said tubular saw blade rotates within said stator housing covering on bearing members;
   b) reverse thread grooves on the exterior surface of the tubular saw blade proximate the cutting edge and immediately inside the stator housing covering to force debris out the space between the saw blade and the stator housing covering; and
   c) a positive air pressure source operatively attached to an opening to the space between the saw blade and the housing covering and is adapted to create a positive air flow through the space between the saw blade and the housing covering to force debris outward, where the support surface comprises a front table portion and a rear table portion and the front table portion has a table drop mechanism adapted to lower the rear most end of the front table portion adjacent the opening of the saw blade thereby increasing the size of the opening.

64. A method of removing a core portion with an enlarged portion from a work piece comprising:
   a) positioning the work piece on a table in front of a saw blade having an upwardly arched cutting blade defining an opening thereunder, the table being at an intermediate level relative to the opening so as to define a portion of the saw blade opening above the table suitable to receive the large portion of the core; and
   b) pushing the large portion of the core of the work piece into the saw blade opening while cutting around the large portion of the core with the saw;
   c) pressurizing a space between a housing and the saw blade to help prevent work piece cuttings from entering the space.

65. A method of removing a core portion with an enlarged portion from a work piece comprising:
   a) positioning the work piece on a table in front of a saw blade having an upwardly arched cutting blade defining an opening thereunder, the table being at an intermediate level relative to the opening so as to define a portion of the saw blade opening above the table suitable to receive the large portion of the core; and
   b) pushing the large portion of the core of the work piece into the saw blade opening while cutting around the large portion of the core with the saw;
   c) selectively inserting a core remover into the opening to remove a core from the opening prior to positioning of another work piece on the table.

* * * * *